US008698344B2

(12) United States Patent
Tokue et al.

(10) Patent No.: US 8,698,344 B2
(45) Date of Patent: Apr. 15, 2014

(54) NAVIGATION APPARATUS

(75) Inventors: Jun Tokue, Yokohama (JP); Kazuhiro Yamamoto, Yokohama (JP); Hiroaki Masuda, Yokohama (JP); Yasuo Oishi, Niiza (JP); Yukihiko Suzaki, Niiza (JP)

(73) Assignee: Honda Access Corp., Niiza-shi (JP)

( * ) Notice: Subject to any disclaimer, the term of this patent is extended or adjusted under 35 U.S.C. 154(b) by 1185 days.

(21) Appl. No.: 12/598,707

(22) PCT Filed: May 2, 2008

(86) PCT No.: PCT/JP2008/058408
§ 371 (c)(1),
(2), (4) Date: Nov. 3, 2009

(87) PCT Pub. No.: WO2008/136509
PCT Pub. Date: Nov. 13, 2008

(65) Prior Publication Data
US 2010/0121570 A1    May 13, 2010

(30) Foreign Application Priority Data

May 3, 2007   (JP) ................................. 2007-121991
Dec. 28, 2007 (JP) ................................. 2007-340982

(51) Int. Cl.
*B60L 1/00*    (2006.01)
*B60L 3/00*    (2006.01)
*H02G 3/00*   (2006.01)

(52) U.S. Cl.
USPC ......................................................... 307/9.1

(58) Field of Classification Search
USPC .................................... 307/1, 9.1; 701/1, 444
See application file for complete search history.

(56) References Cited

U.S. PATENT DOCUMENTS 5,859,628 A * 1/1999 Ross et al. .................... 345/173
5,917,435 A   6/1999 Kamiya et al.
(Continued)

FOREIGN PATENT DOCUMENTS

EP    1155916 A1   11/2001
EP    1598640 A1   11/2005
(Continued)

OTHER PUBLICATIONS

Supplementary European Search Report dated Mar. 12, 2010, issued in corresponding European Patent Application No. 08752313.0.
(Continued)

*Primary Examiner* — Carlos Amaya
(74) *Attorney, Agent, or Firm* — Westerman, Hattori, Daniels & Adrian, LLP

(57) ABSTRACT

In a navigation apparatus having a cradle unit that is fastenable to a vehicle and is equipped with at least a microcomputer; and a front panel unit that is attachable to and detachable from the cradle unit and is equipped with at least a display displaying map data and a microcomputer performing a navigation function to indicate a determined location of the vehicle on the map data, it is configured such that a panel is integrally formed at bottom of the cradle unit to be attachable to the vehicle. With this, it becomes possible to provide the navigation apparatus configured such that a member having a microcomputer performing a navigation function is attachable/detachable to/from the main body, i.e., the base unit, thereby improving ease of use, that the member can be easily attached to the dashboard of the vehicle, and that unnatural impression is prevented from arising in the appearance.

3 Claims, 29 Drawing Sheets

(56) References Cited

U.S. PATENT DOCUMENTS

| | | |
|---|---|---|
| 6,119,060 A | 9/2000 | Takayama et al. |
| 2005/0085952 A1 | 4/2005 | Park et al. |

FOREIGN PATENT DOCUMENTS

| | | |
|---|---|---|
| JP | 4-50545 U | 4/1992 |
| JP | 09-023540 A | 1/1997 |
| JP | 10-272993 A | 10/1998 |
| JP | 11-115553 A | 4/1999 |
| JP | 2001-277902 A | 10/2001 |
| JP | 2002-357425 A | 12/2002 |
| JP | 2002-370587 A | 12/2002 |
| JP | 3376813 B2 | 2/2003 |
| JP | 2003-163618 A | 6/2003 |

OTHER PUBLICATIONS

International Search Report of PCT/JP2008/058408, mailing date of Jul. 15, 2008.
European Office Action dated Sep. 30, 2010, issued in corresponding European patent Application No. 08 752313.0.

* cited by examiner

FIG.5
(a)
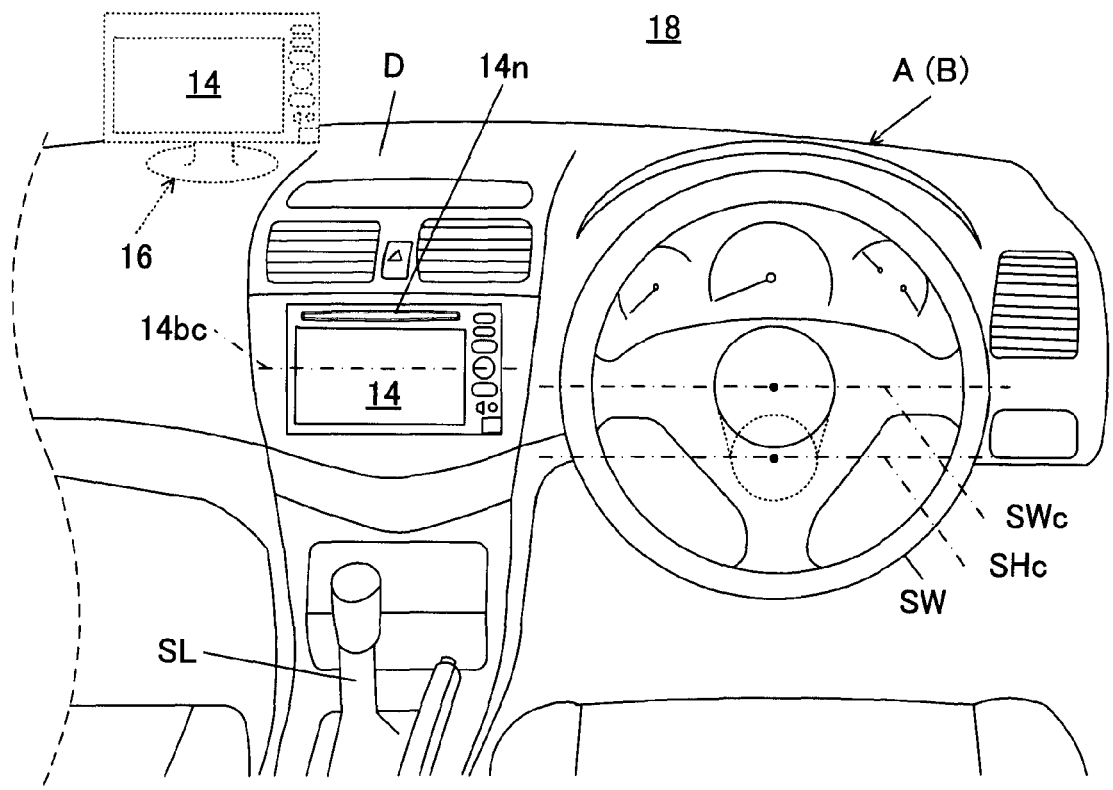
(b)
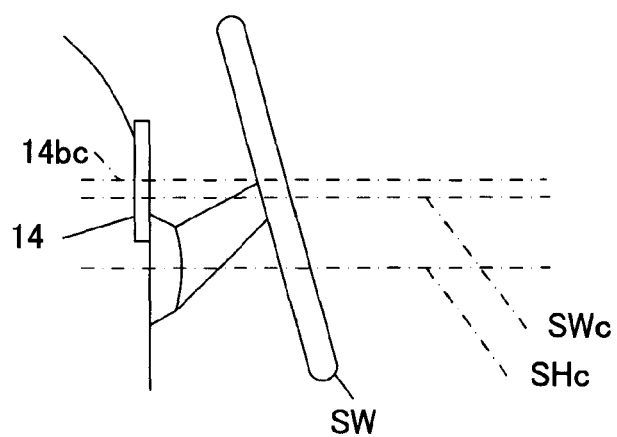

FIG. 15

| CONDITION \ EVENT | REVERSE GEAR SW ON | PHONE RINGING | DVD PLAYBACK ON |
|---|---|---|---|
| VEHICLE IS BACKING UP |  | RINGING IS NOT MADE REAR MONITOR MODE CONTINUED | REAR CAMERA'S IMAGE IS ON MONITOR DVD STOPPED |
|  |  | RADIO WAVE: WCM | RADIO WAVE: WCM |
|  |  | IMAGE: REAR CAMERA | IMAGE: REAR CAMERA |
| PHONE IS RINGING | RINGING IS CUT OFF REAR MONITOR MODE |  | RINGING MODE DVD NOT PLAYED |
|  | RADIO WAVE: WCM |  | RADIO WAVE: BT |
|  | IMAGE: REAR CAMERA |  | IMAGE: INCOMING CALL SCREEN |
| PHONE IS ENGAGED | PHONE CALL IS DISCONNECTED REAR MONITOR MODE |  | PHONE ENGAGED MODE DVD NOT PLAYED |
|  | RADIO WAVE: WCM |  | RADIO WAVE: BT |
|  | IMAGE: REAR CAMERA |  | IMAGE: PHONE ENGAGED SCREEN |
| DVD IS PLAYING | DVD PLAYBACK IS STOPPED REAR MONITOR MODE | DVD SOUND PLAYBACK IS STOPPED PHONE RINGING |  |
|  | RADIO WAVE: WCM | RADIO WAVE: BT |  |
|  | IMAGE: REAR CAMERA | IMAGE: PHONE ENGAGED SCREEN |  |

| HARD BUTTON | SOFT BUTTON |
|---|---|
| POWER | SWITCH AV SOURCE |
| EJECT | RESTORE GUI |
| DISPLAY CURRENT LOCATION | PLAY DVD |
| SET DESTINATION | STOP DVD |
| VOLUME UP(DOWN) | TUNE UP FREQUENCY |
| SKIP | TUNE DOWN FREQUENCY |
| MENU | |

NAVIGATION APPARATUS

TECHNICAL FIELD

This invention relates to a navigation apparatus, more specifically to an apparatus mounted in a vehicle for communicating to a driver information (directional, map, road, etc.) for reaching a destination.

BACKGROUND ART

Although navigation apparatuses of the foregoing type were initially limited to types integrally fixed to the vehicle, there have recently also been proposed easily-carried portable types, as well as detachable navigation apparatuses that further improve ease-of-use by enabling only the section with navigation functions to be mounted and dismounted (see, for example, Patent Reference 1).

According to the technology taught by Patent Reference 1, a navigation apparatus comprising a GPS receiver connected to a GPS antenna, a gyrosensor, a vehicle signal processor circuit including a vehicle speed signal, a display for displaying a map, and an ECU for overall control is equipped with a vehicle side unit provided on the vehicle side and a detachable unit detachably provided on the vehicle, and at least the gyrosensor and the vehicle signal processor circuit are mounted on the vehicle side, while the display and ECU are installed in the detachable unit to enable removal from the vehicle for use in the outside of the vehicle.

Patent Reference 1: Japanese Patent No. 3376813

DISCLOSURE OF THE INVENTION

Problems to be Solved by the Invention

When the aforementioned navigation apparatus is attached to a dashboard of the vehicle, it is attached through a cradle unit. In this case, it is preferable to be able to easily attach the apparatus and prevent unnatural impression from arising in the appearance.

The object of this invention is therefore to solve the aforesaid drawbacks and provide a navigation apparatus that is configured such that a member having a microcomputer performing a navigation function is attachable/detachable to/from a main body, i.e., a cradle unit, thereby improving ease of use, that the member can be easily attached to a dashboard of a vehicle, and that unnatural impression is prevented from arising in the appearance.

Means for Solving the Problems

In order to achieve the object, as recited in claim 1 mentioned below, this invention is configured to have a navigation apparatus having: a cradle unit that is fastenable to a vehicle and is equipped with at least a microcomputer; and a front panel unit that is attachable to and detachable from the cradle unit and is equipped with at least a display displaying map data and a microcomputer performing a navigation function to indicate a determined location of the vehicle on the map data, characterized in that: a panel is integrally formed at bottom of the cradle unit to be attachable to the vehicle.

As recited in claim 2 mentioned below, the apparatus is configured such that the panel is formed with an extension part that is extended to vicinity of an external power supply socket when the panel is attached to the vehicle.

As recited in claim 3 mentioned below, the apparatus is configured such that back of the extension part is formed with a gap that houses an electrical wire extending from the external power supply socket to the cradle unit.

Effects of the Invention

In claim 1, in a navigation apparatus having: a cradle unit that is fastenable to a vehicle and is equipped with at least a microcomputer; and a front panel unit that is attachable to and detachable from the cradle unit and is equipped with at least a display displaying map data and a microcomputer performing a navigation function to indicate a determined location of the vehicle on the map data, it is configured such that a panel is integrally formed at bottom of the cradle unit to be attachable to the vehicle. With this, it becomes possible to provide the navigation apparatus that is configured such that a member having a microcomputer performing a navigation function is attachable/detachable to/from the main body, i.e., the base unit, thereby improving ease of use, that the member can be easily attached to the dashboard of the vehicle, and that unnatural impression is prevented from arising in the appearance.

In claim 2, in the apparatus, it is configured such that the panel is formed with an extension part that is extended to vicinity of an external power supply socket when the panel is attached to the vehicle. With this, in addition to the foregoing effects, connection with the external power supply becomes further easier.

In claim 3, in the apparatus, it is configured such that back of the extension part is formed with a gap that houses an electrical wire extending from the external power supply socket to the cradle unit. With this, in addition to the foregoing effects, the electrical wire supplying power to the cradle unit can be made invisible and unnatural impression is prevented from arising in the appearance.

BRIEF DESCRIPTION OF THE DRAWINGS

FIG. 5 is a set of explanatory views of a vehicle driver's seat of the vehicle shown in FIG. 4.

FIG. 15 is an explanatory view of processing in accordance with priority for preventing interference of devices shown in FIG. 6, etc.

BEST MODES FOR CARRYING OUT THE INVENTION

Best modes for carrying out the navigation apparatus according to this invention are explained with reference to the attached drawings in the following.

First Embodiment

Figure 1:
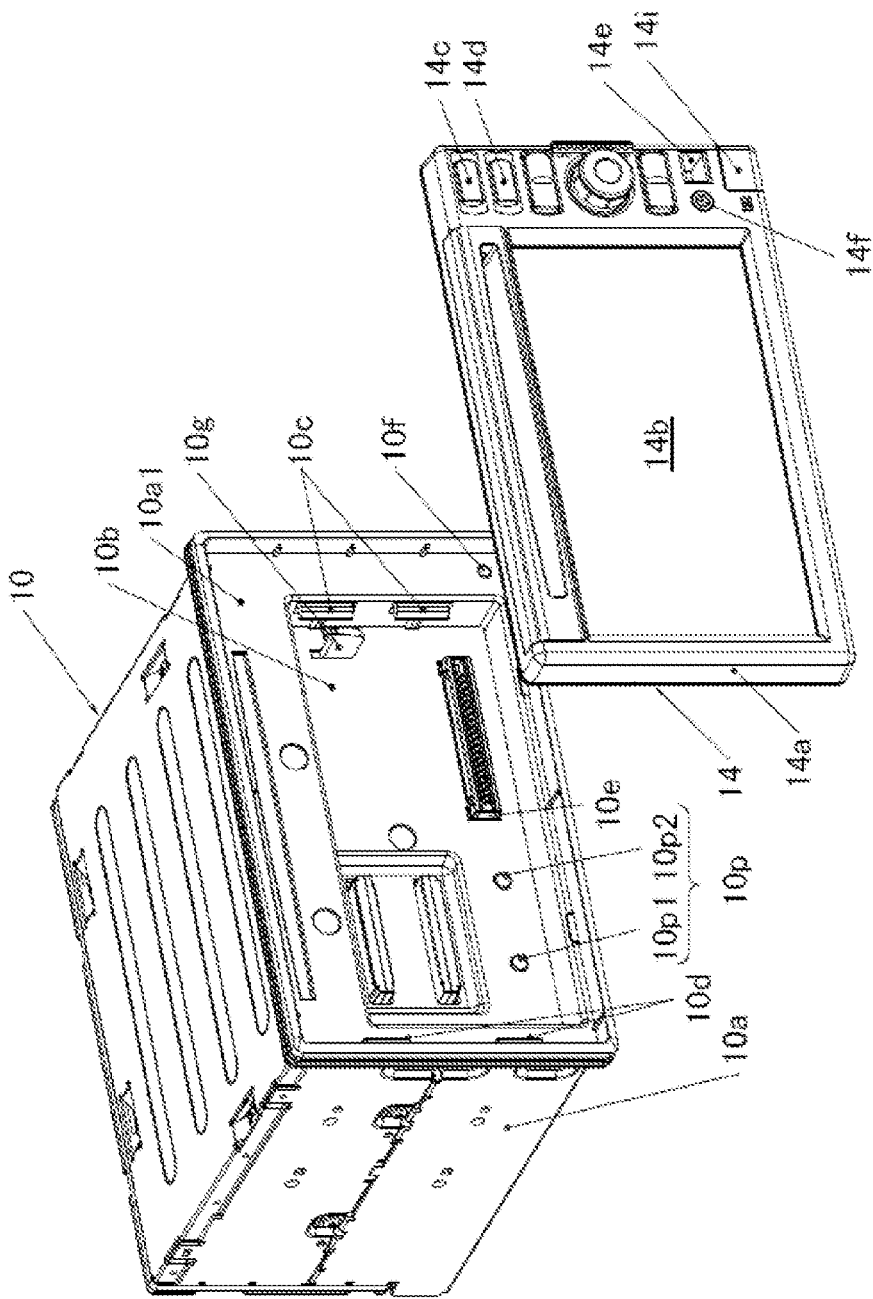
FIG. 1 is a perspective view from the front of a base unit and front panel unit of a navigation apparatus according to a first embodiment of this invention.
Figure 2:
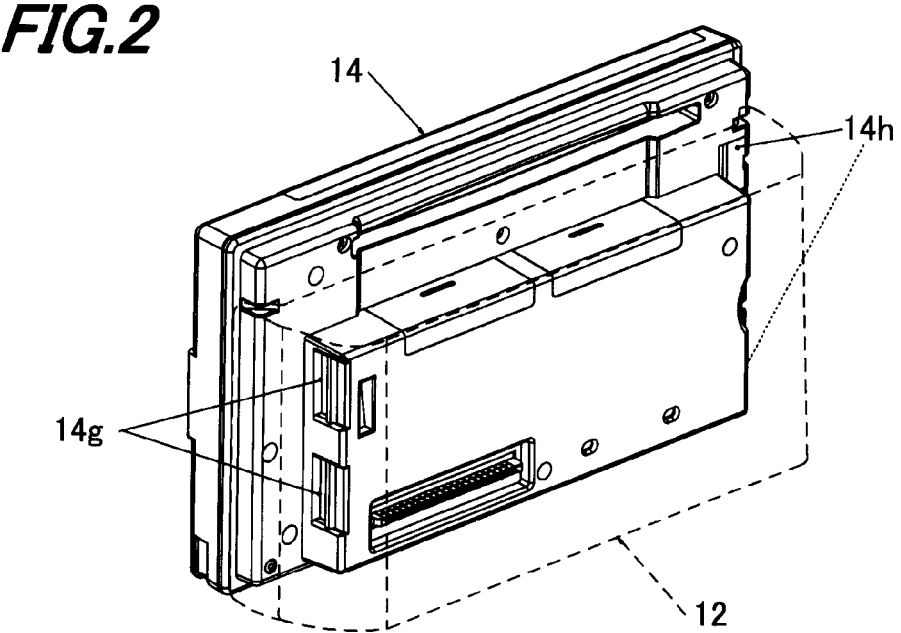
FIG. 2 is a perspective view from the rear of the front panel unit shown in FIG. 1.
Figure 3:
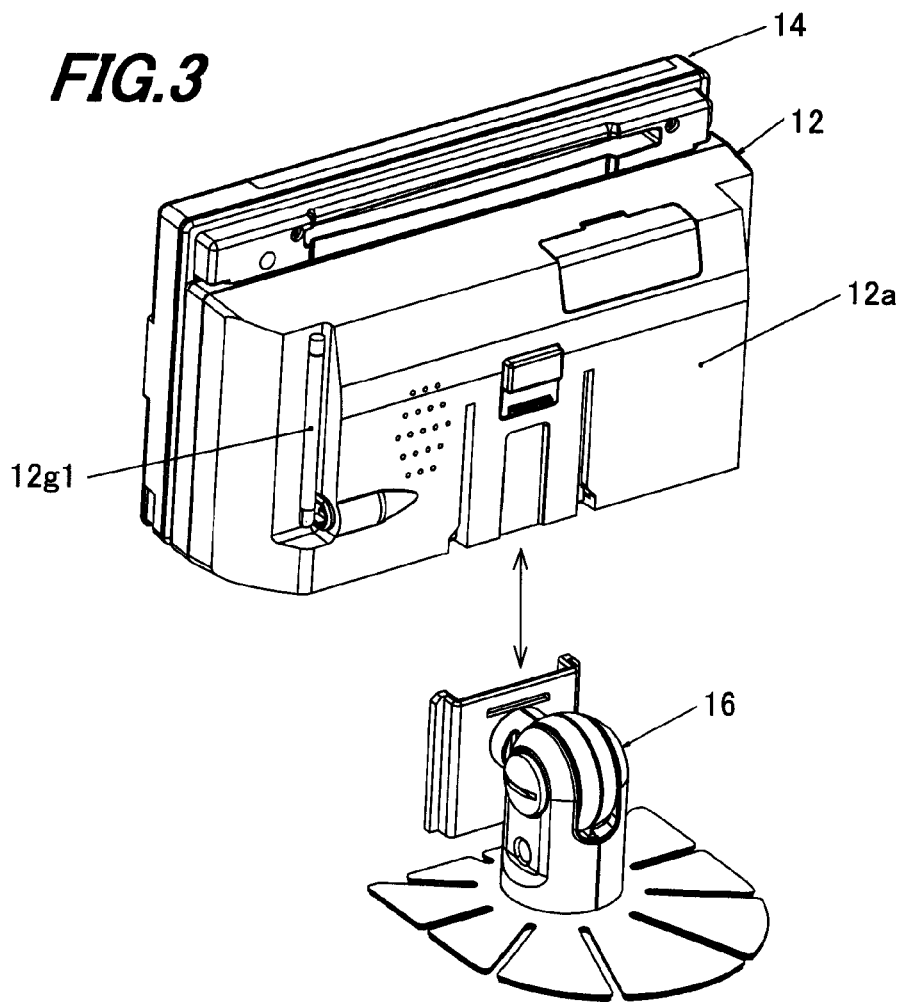
FIG. 3 is a perspective view of the front panel unit (rear side) shown in FIG. 1, a cradle unit and a cradle unit attachment arm.
Figure 4:
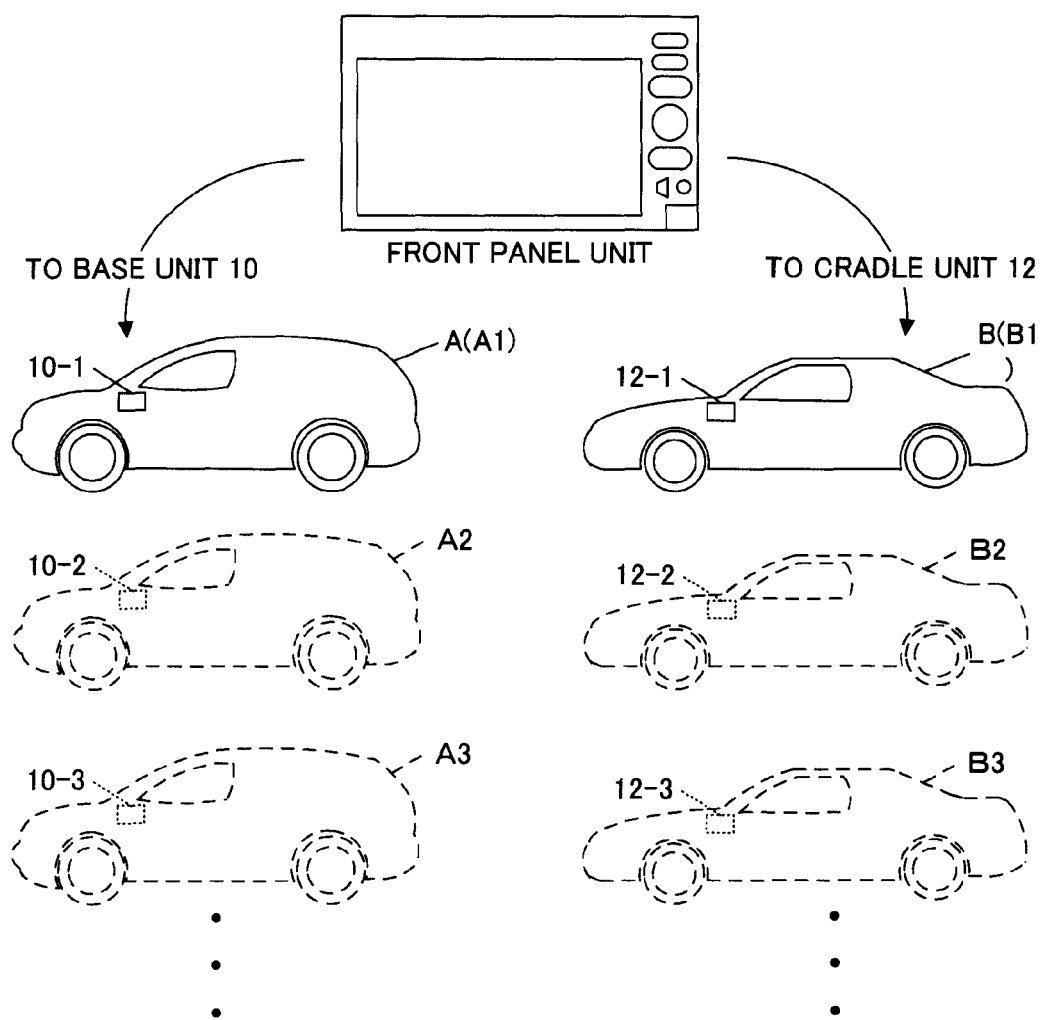
FIG. 4 is an explanatory view showing the base unit shown in FIG. 1 and the cradle unit in the installed condition.

FIG. 1 is a perspective view from the front of a base unit and front panel unit of a navigation apparatus according to a first embodiment of this invention, FIG. 2 is perspective view from the rear of the front panel unit, and FIG. 3 is perspective view of the front panel unit (rear side), a cradle unit and a cradle unit attachment arm. FIG. 4 is an explanatory view showing it in the installed condition, FIG. 5(a) is an explanatory view from a vehicle driver's seat, and FIG. 5(b) is a side view thereof showing the vicinity of a steering wheel.

As illustrated, the navigation apparatus according to this embodiment of the invention is fastened to or built into (is fastenable to/in) the dashboard of a vehicle A, and is equipped with the base unit 10 supplied with operating power from a power supply (battery) of the vehicle A, the cradle unit 12 to be fastened (fastenable) on the dashboard of a vehicle B and supplied with operating power from a power supply (battery) of the vehicle B, and the front panel unit 14 attachable/detachable to/from the base unit 10 or cradle unit 12. The vehicle A and vehicle B are automobiles.

The navigation apparatus according to this embodiment is basically the combination of the base unit 10 and front panel unit 14. However, an application in which the front panel unit 14 is attached to the cradle unit 12 is also acceptable. As shown in FIG. 4, the advantages of this apparatus can be enhanced if base units 10-1, 10-2, 10-3 . . . or cradle units 12-1, 12-2, 12-3 . . . are removably installed in associated vehicles A1, A2, A3 . . . or B1, B2, B3 . . . , and the user uses the apparatus after presetting the front panel unit 14 to his or her personal screen settings and switching it to correspond to the ID number of the associated base unit 10 or cradle unit 12.

The base unit 10 is equipped with a base unit case 10a having the overall shape of a box and internally accommodates a board or the like on which is mounted, inter alia, a microcomputer enabling operation of audio equipment of the vehicle A. The front of the base unit case 10a is formed to 2DIN (DIN: Deutsches Institut für Normung) size and has a recess 10b formed therein.

The front panel unit 14 is equipped with a plate-shaped front panel unit case 14a about the same size as or somewhat larger than the front of the base unit 10 and the front of the front panel unit case 14a is equipped with a liquid crystal panel (display) 14b for displaying map data and switches provided to be operable by the user (operator), including, for example, a destination input switch 14c and a current location input switch 14d. The liquid crystal panel 14b is provided with a touch panel capable of detecting points touched by the user (operator), as will explained later. Symbols 14e and 14f designate jacks for connecting an iPod (registered trademark) and analog audio equipment, respectively.

The front panel unit 14 is configured to be detachably mounted in a recessed part 10a1 and a recess 10b of the front of the base unit case 10a (to be freely attached and detached). Of the operations of the attach/detach mechanism, the mounting will be explained first. As shown in FIG. 2, the back of the front panel unit 14 is formed on the left side with two vertically spaced fixed claws 14g and on the right side with two vertically spaced movable catch slides 14h. Two vertically spaced movable lock levers 10c are provided on the right side of the recess 10b of the base unit 10, and two vertically spaced fixed claws 10d are formed on the left side, and when the front panel unit 14 is attached, they respectively engage with the fixed claws 14g and catch slides 14h of the front panel unit 14.

Note that in this specification the "vertical" direction is that on the vertical axis (gravitational axis) of the base unit 10, front panel unit 14 and the like in their condition as fastened to the vehicle A or B and the lateral direction is a direction perpendicular thereto.

As shown in FIG. 1, a connector 10e is provided in the recess 10b of the base unit 10. When attached to the base unit 10, the front panel unit 14 is supplied with operating power from the power supply (battery) of the vehicle A through the connector 10e and sent/received with data and control signals of various sensors, including a GPS signal receiver 20, AV equipment and the like therethrough. Among the electrical contacts of the connector 10e, the left and right electrical contacts are ground contacts.

The recess 10b of the base unit 10 is provided alongside the connector 10e at the bottom with multiple ground terminals 10p, specifically two designated 10p1 and 10p2, made of a conductor such as copper.

Turning next to an explanation of the detachment, a detach button 14i is provided on the front panel unit 14 under the jacks 14e and 14f. When the front panel unit 14 is in the attached state with the base unit 10 and the user presses the detach button 14i, the resulting movement is transmitted to the lock levers 10c through a detach knob 10f provided in the base unit 10, whereby the lock levers 10c are moved outward to disengage them from the fixed claws.

The catch slides 14h on the right side of the front panel unit 14 are only urged outward (rightward in FIG. 2) by spring force to be engaged with the fixed claws 10d of the base unit 10. Therefore, if the engagement between the lock levers 10c and the fixed claws 14g on the left side is released and the user moves the front panel unit 14 (leftward in FIG. 1) by greater than the overlap span of the catch slides 14h and the fixed claws 10d, the engagement with the base unit 10 is released to enable detachment of the front panel unit 14 from the base unit 10.

As shown in FIG. 1, a release lever 10g is provided in the recess 10b in the front of the base unit 10. When the front panel unit 14 is attached, the release lever 10g is urged in the direction of ejecting it by a kick lever loaded with a spring (neither shown). A panel unit detection switch (not shown) is attached to the release lever 10g and produces outputs or signals in response to the location of the release lever 10g, i.e., the attachment and detachment of the front panel unit 14; for example, produces an ON signal when the front panel unit 14 is attached and an OFF signal when it is detached.

As shown in FIGS. 2 and 3, the cradle unit 12 is detachably attached to the back of the front panel unit 14. The attach/detach mechanism between the front panel unit 14 and cradle unit 12 is not illustrated, but it is similar to the attach/detach mechanism between the front panel unit 14 and base unit 10 explained with reference to FIG. 1, and the front panel unit 14 is removably attached to the cradle unit 12 via lock levers, catch slides and so on. The cradle unit 12 is also equipped with a panel unit detection switch.

The cradle unit 12 is fastened to the dashboard of the vehicle B through a cradle unit attachment arm 16. The cradle unit 12 is equipped with a cradle unit case 12a that is shorter in height and greater (deeper) in depth than the front panel unit case 14a and internally accommodates, inter alia, a board on which a microcomputer and the like are mounted.

The front panel unit 14 is fastened to the dashboard of the vehicle B also through a panel integrated cradle, other than a set of the cradle unit 12 and cradle unit attachment arm 16. This will be explained later.

As shown FIG. 5, the front panel unit 14 of the navigation apparatus according to this embodiment is either mounted near the driver's seat of the vehicle A or B, more exactly is installed in the base unit 10 (not visible in FIG. 5) built into the dashboard D, or installed on the dashboard D via the cradle unit 12. In either location, the front panel unit 14 is installed at a height near that of a windshield 18.

More concretely, when the front panel unit 14 is attached to the base unit 10, the longitudinal center line 14bc of the liquid crystal panel of the front panel unit 14 is, as viewed by the user (of average sitting height), slightly higher than the rotation center SWc of the steering wheel SW and considerably higher than the rotation center SHc of the steering shaft at the dashboard plane (substantially the front plane of the front panel unit 14), i.e., the rotation center SHc is located toward the undersurface of the front panel unit 14. Symbol SL designates a transmission shift lever.

As set out in the forgoing, the front panel unit 14 of the navigation apparatus according to this embodiment is configured to be attachable/detachable to/from the base unit 10 or cradle unit 12.

Figure 6:
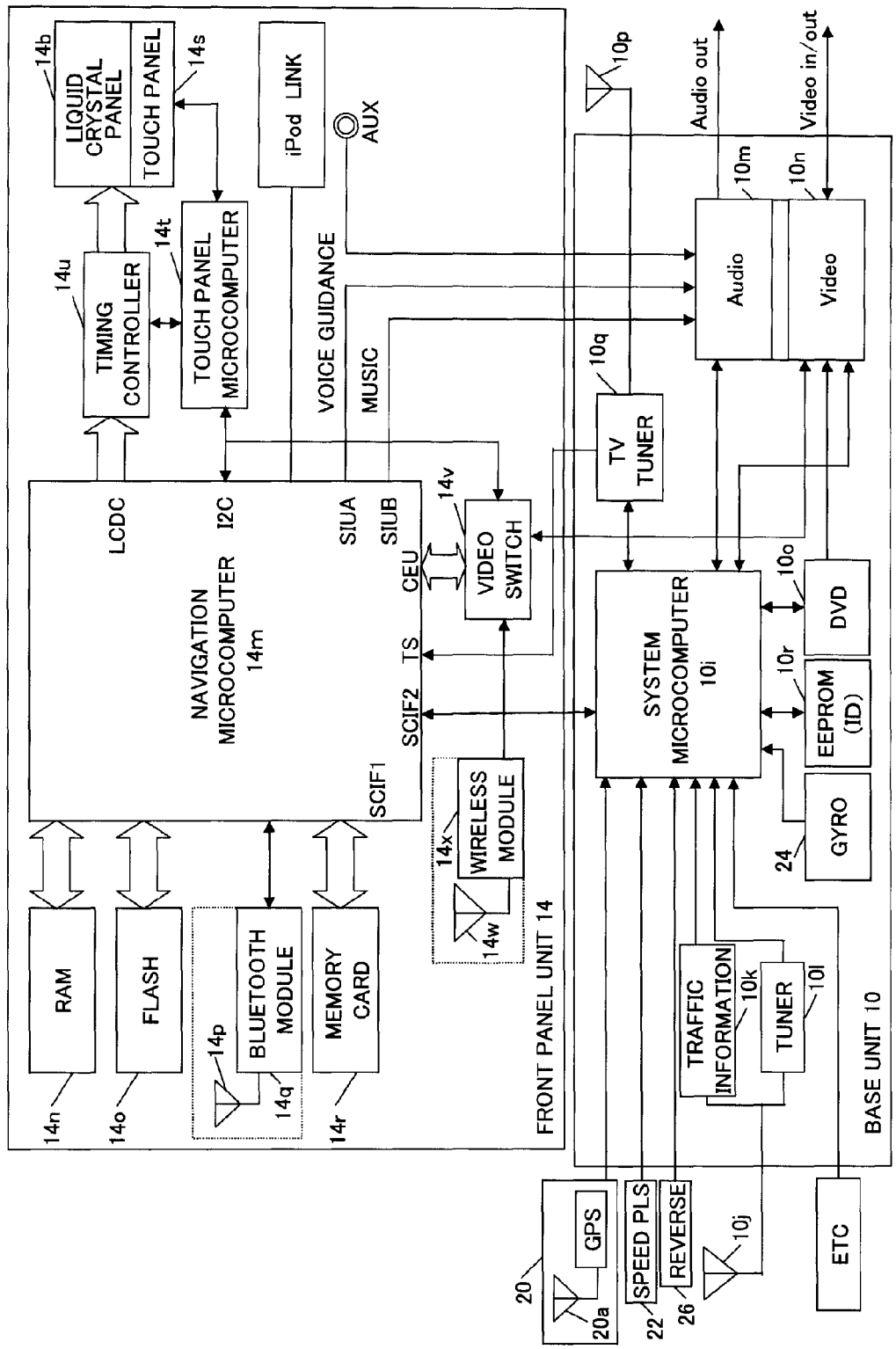
FIG. 6 is a block diagram showing the internal configuration of the front panel unit and base unit.
Figure 7:
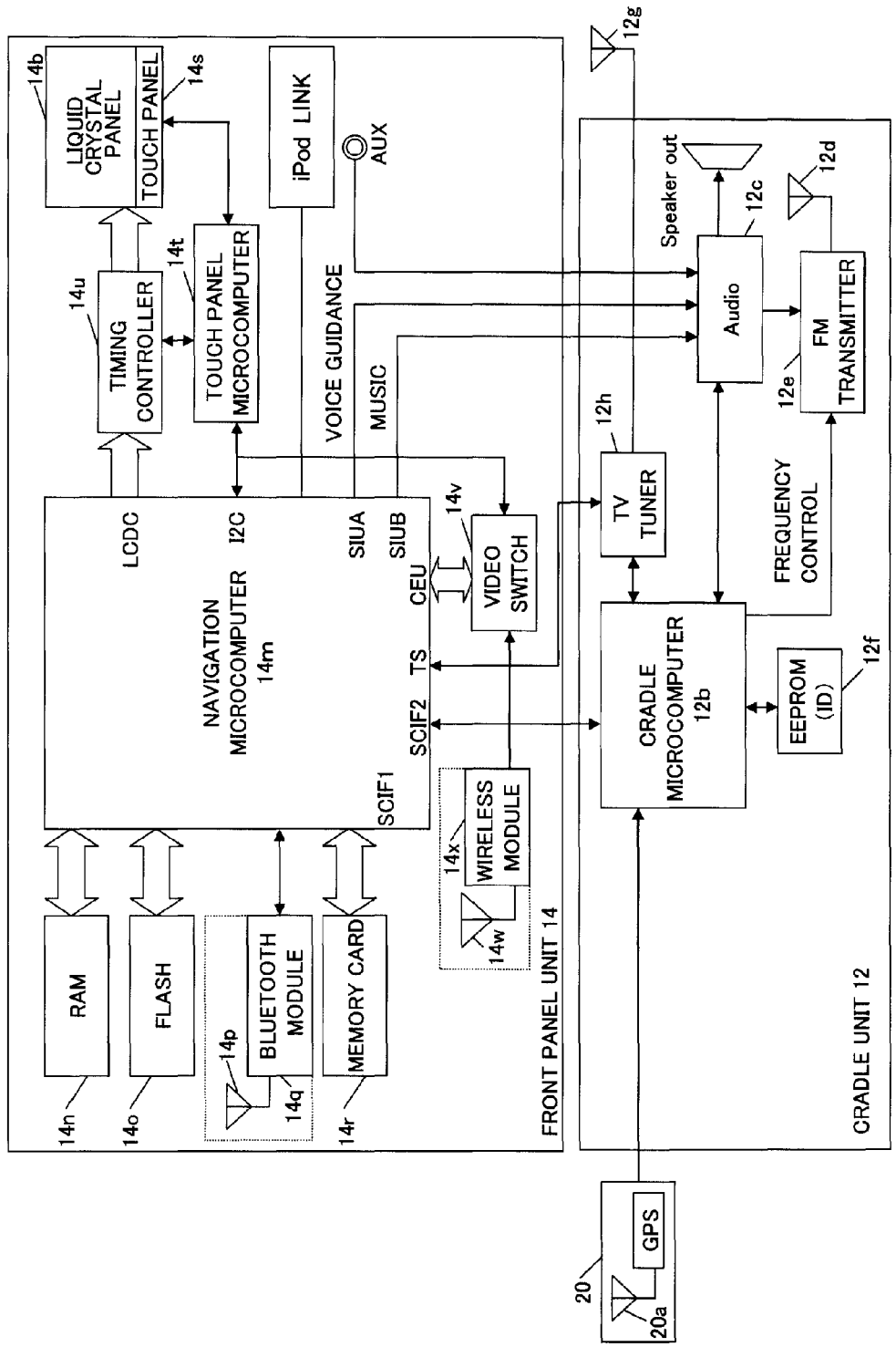
FIG. 7 is a block diagram showing the internal configuration of the front panel unit and cradle unit.

FIG. 6 is a block diagram showing the internal configuration of the front panel unit 14 and base unit 10, and FIG. 7 is a block diagram showing the internal configuration of the front panel unit 14 and cradle unit 12.

As shown in FIG. 6, the front panel unit 14 is equipped with a microcomputer (called the "navigation microcomputer") 14m and the base unit 10 is equipped with a microcomputer (called the "system microcomputer") 10i. Further, as shown in FIG. 7, the cradle unit 12 is equipped with a microcomputer (called the "cradle microcomputer") 12b. The navigation microcomputer 14m has several times greater processing capability than the system microcomputer 10i and cradle microcomputer 12b.

Continuing the explanation of FIG. 6, the base unit 10 equipped with the system microcomputer 10i is further equipped with a traffic information module (VICS) 10k for receiving traffic information via an antenna 10j attached to the vehicle A, a tuner 10l for receiving broadcast waves sent to onboard audio equipment (AM/FM radio etc.; not shown) of the vehicle A, an audio circuit block 10m for controlling the operation of the onboard audio equipment, a video circuit block 10n for displaying DVD and other images on the liquid crystal panel 14b of the front panel unit 14, a DVD module 10o for operating in intercommunication with the system microcomputer 10i, reading audio and image signals from a CD or DVD, demodulating the image signals and sending them to the video circuit block 10n as analog signals, a TV tuner 10q for receiving terrestrial digital broadcasts via an antenna 10p, and an EEPROM 10r comprising a nonvolatile memory.

The base unit 10 is further equipped with a GPS signal receiver (designated "GPS") 20 for receiving GPS (Global Positioning System) signals, a wheel speed sensor (designated "SPEED PLS") 22, a gyrosensor (designated "GYRO") 24 and a reverse gear switch (designated REVERSE) 26. The reverse gear switch 26 is connected to a transmission or a transmission shift lever 30 (FIG. 5).

The GPS signal receiver 20 is equipped with an antenna 20a which is attached at an appropriate location such as on the base unit case 10a, dashboard or meter visor. Note that when the front panel unit 14 is detached from the base unit 10 and attached to the cradle unit 12, the GPS signal receiver 20 uses an antenna attached at an appropriate location on the cradle unit case 12a or attachment arm 16.

The wheel speed sensor 22 is installed near the driveshaft (not shown) of the vehicle A and outputs a pulse signal every predetermined rotation angle of the driveshaft, i.e., wheels (tires) (in other words, it detects the rotational speed of the vehicle A wheels). The gyrosensor 24 is disposed inside the base unit case 10a and produces an output whose voltage varies with the angular velocity (yaw rate) about the gravity axis (vertical axis) at the center of gravity of the vehicle A (in other words, it detects the angular velocity (yaw rate) about the vertical axis, more specifically about the three axes X, Y and Z).

The gyrosensor 24 is enabled to experience the same vibration as the vehicle A by installing it on a suitable board in the interior of the base unit case 10a to be near edge or other board attachment screws, and since its sensitivity varies with attachment angle, the attachment angle is measured after attachment to the vehicle A and the measured value is stored in the EEPROM 10r as a correction value.

The reverse gear switch 26 installed at an appropriate location on the transmission (not shown) or shift lever 30 (shown in FIG. 5) of the vehicle A and outputs an ON signal when the reverse gear for backing up the vehicle A is engaged (ON) or the shift lever 30 is in the R position, i.e., when the vehicle A is about to back up.

The front panel unit 14 equipped with the navigation microcomputer 14m is further equipped with a RAM 14n, a FLASH memory 14o for storing map data and the like for navigation, a BT (Bluetooth) module 14q for transmitting and receiving 2.45 GHz radio waves to/from a mobile telephone hands-free microphone via an antenna 14p attached to the front panel unit case 14a, a memory card 14r, a touch panel 14s installed on the liquid crystal panel 14b, a touch panel microcomputer 14t for controlling the operation thereof, a timing controller 14u for generating various sync signals for liquid crystal display, a video switch 14v for performing input/output of the video circuit block 10n and the like of the base unit 10, and a wireless module 14x for wireless reception of image data from a rear camera in the same frequency band via an antenna 14w attached to the front panel unit case 14a.

To be more specific, the BT module (short-range transceiver module) 14q and wireless module (dedicated image data receiving module) 14x are installed on the back of the front panel unit case 14a.

In the configuration shown in FIG. 6, the signal receiver 20 that receives the GPS signals is installed on the base unit 10, and the location information acquired from the GPS signals is, along with the outputs of the wheel speed sensor 22, gyrosensor 24 and reverse gear switch 26, sorted into time-coincident data, integrated and sent to the navigation microcomputer 14m by the system microcomputer 10i.

After first acquiring the location of the vehicle A based on the GPS signals, the navigation microcomputer 14m corrects it based on the outputs of the wheel speed sensor 22 and the gyrosensor 24. Thus, the navigation microcomputer 14m determines the location of the vehicle A by autonomous navigation. The vehicle location determined by autonomous navigation is stored in the FLASH memory 14o and/or the EEPROM 10r at regular intervals, so that the current location can be estimated immediately after the engine of the vehicle A is started and power is turned ON.

Note that low-speed digital signals are sent and received between the system microcomputer 10i and the navigation microcomputer 14m over a signal line (serial data line), while image signals inputted through the TV tuner 10q are sent out to the front panel unit 14 over a separate data line as high-speed digital signals. In contrast, image signals inputted from the DVD module or exterior are inputted to the video circuit block 10n of the base unit 10 and thereafter sent over a signal line to the video switch 14v of the front panel unit 14 as analog signals. The video switch 14v sends its output to the navigation microcomputer 14m as a digital signal and also receives a control signal inputted from the navigation microcomputer 14m. In addition, the picture signal of the wireless module 14x is sent through the video switch 14v to the video circuit block 10n from where it can be sent through an external terminal to another video device for viewing, recording or the like.

Next, turning to an explanation of the internal structure of the cradle unit 12 with reference to FIG. 7, the cradle unit 12 equipped with the cradle microcomputer 12b is further equipped with an audio circuit block 12c for controlling audio input to a speaker built into the cradle unit 12, an FM transmitter 12e for radio wave transmission of the output of an audio module from an antenna 12d, an EEPROM 12f comprising a nonvolatile memory, and a TV tuner 12h for receiving terrestrial digital broadcasts via an antenna 12g.

Note that when the front panel unit 14 is detached from the base unit 10 and attached to the cradle unit 12 as set out above, the antenna 20a of the GPS signal receiver 20 used is that of the vehicle B.

The cradle microcomputer 12b sends the location information obtained from the GPS signals to the navigation microcomputer 14m of the front panel unit 14 and the navigation microcomputer 14m determines the location of the vehicle B based solely on the GPS signals.

Figure 8:
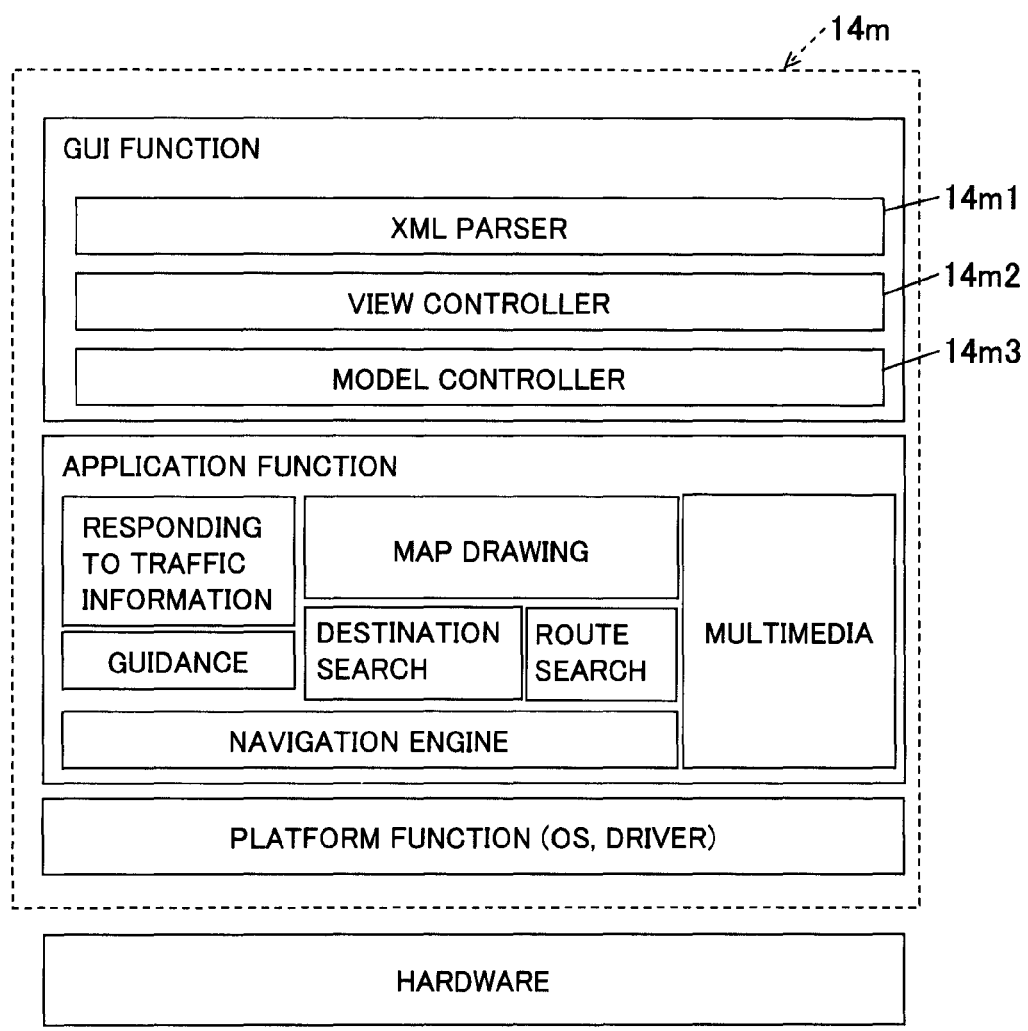
FIG. 8 is a block diagram showing the software configuration of navigation microcomputer shown in FIG. 6.
Figure 9:
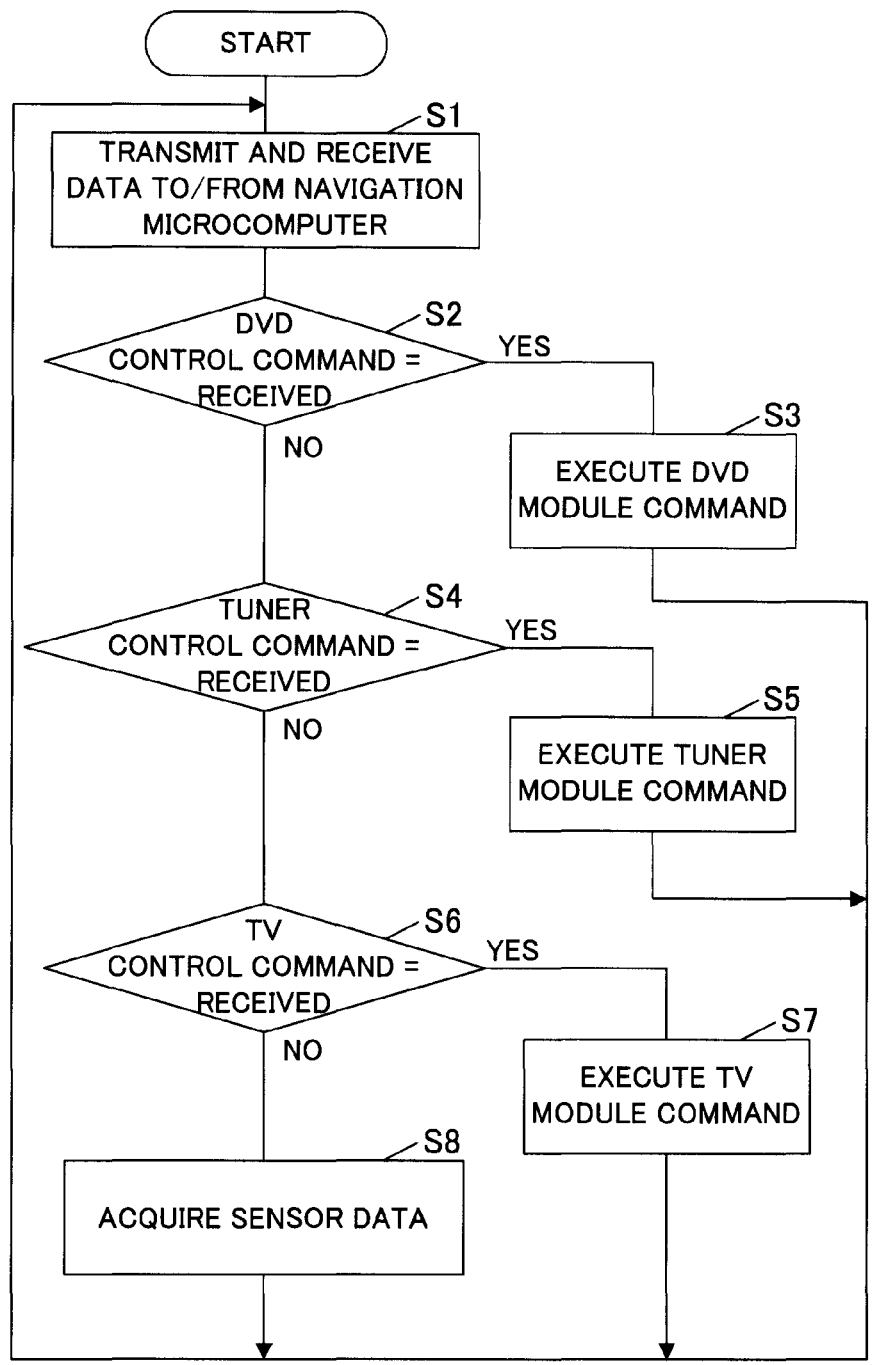
FIG. 9 is a flowchart showing the software configuration of the navigation microcomputer shown in FIG. 6.

As regards the navigation microcomputer 14m and system microcomputer 10i shown in FIG. 6, the software configuration of the navigation microcomputer 14m is shown in FIG. 8 and the software configuration of the system microcomputer 10i is shown in FIG. 9.

In the case of operating equipment that, like a navigation apparatus, has many functions and many settings, use of a Graphical User Interface (hereinafter called "GUI") enables the user to visually understand the operating method. Taking this point into account, the navigation apparatus according to this embodiment incorporates into the navigation microcomputer 14m of the front panel unit 14 shown in FIG. 6 a configuration enabling GUI customization, whereby the functions are executed through the user's operation of the touch panel 14s.

Specifically, as shown in FIG. 8, the navigation microcomputer 14m is equipped with a GUI function for displaying a menu on the liquid crystal panel 14b and executing functions designated by having the user touch specified sites on the touch panel 14s, a function (application functions) for executing operations selected by the GUI function, a function (platform functions) for defining processing times for various functions and managing memory space, and a function (driver) for accessing individual peripheral devices (hardware). The GUI function comprises an XML parser 14m1, a VIEW controller 14m2 and a MODEL controller 14m3.

As mentioned earlier, the navigation microcomputer 14m supplies tuner and disk drive control commands to the system microcomputer 10i of the base unit 10 over the signal line (serial data line).

As shown in S1 to S8 of the flowchart in FIG. 9, on the base unit 10 side, the system microcomputer 10i receives commands from the navigation microcomputer 14m, controls peripheral devices, and conveys the information obtained from the devices and sensor data to the navigation microcomputer 14m over the serial data line. Although not shown in the drawings, in the cradle unit 12 the cradle microcomputer 12b performs similar processing to the system microcomputer 10i.

In addition, in the front panel unit 14, the navigation microcomputer 14m determines based on the sensor output condition whether the outputs of the three sensors or just the GPS signals of one sensor output should be used as the sensor(s) for determining the location of the vehicle.

Figure 10:
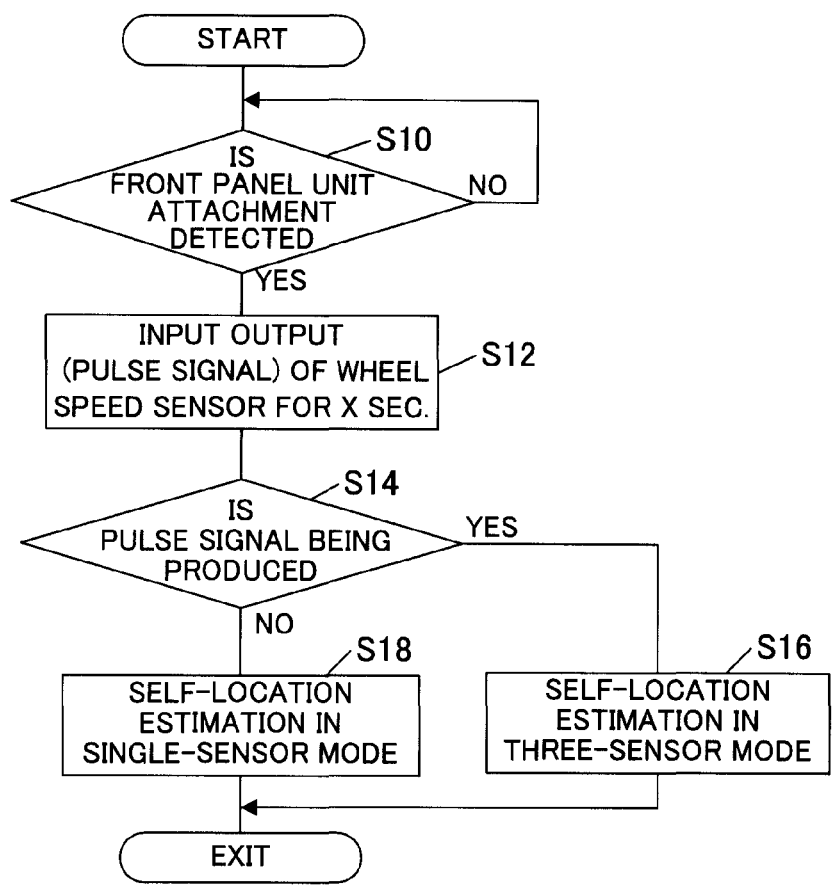
FIG. 10 is a flowchart showing processing of detecting which of the base unit or cradle unit is attached, which is executed by the navigation microcomputer of the front panel unit.

FIG. 10 is a flowchart showing this processing.

Now to explain, in S10 it is checked whether attachment to the base unit 10 of the front panel unit 14 in which it itself is accommodated was detected. Since communication with the system microcomputer 10i through the signal line becomes possible upon attachment to the base unit 10, the navigation microcomputer 14m thereby judges whether its own attachment to the base unit 10 was detected.

When the result in S10 is YES, the program goes to S12, in which the output (pulse signal) of the wheel speed sensor 22 is inputted for X seconds (predetermined time period), e.g., 3 seconds, and the program goes to S14, in which it is checked whether the pulse signal is being produced.

When the result in S14 is YES, the program goes to S16, in which self-location estimation is done in three-sensor mode, i.e., (vehicle A) self-location is determined from the outputs of three sensors (GPS signal receiver 20, wheel speed sensor 22 and the gyrosensor), and when the result in S14 is NO, the program goes to S18, in which self-location estimation is done in single-sensor mode, i.e., (vehicle A) self-location is determined from the output (GPS signals) of the GPS signal receiver 20.

For example, during driving on a congested road, the output of the wheel speed sensor 22 is sometimes not produced or becomes sporadic, but making the decision based on sensor output condition enables the sensor(s) used for location determination to be optimally selected to enhance the accuracy of vehicle location determination, while the flexibility of sensor use in location determination is improved in the point that the location determination is not necessarily restricted to use of three sensors.

Note that although in the processing of FIG. 10 the output of the wheel speed sensor 22 is checked by inputting it for X seconds, it is possible instead to check whether the output of the wheel speed sensor 22 exceeds a predetermined threshold value and select the single-sensor mode when it does not.

Moreover, in the front panel unit 14, in addition to conducting the processing of FIG. 10, the navigation microcomputer 14m recognizes from the information from the system microcomputer 10i or the cradle microcomputer 12b which is installed and determines whether self-location determination should be conducted using the outputs of the three sensors or just the GPS signals of one sensor output. Specifically, the navigation microcomputer 14m of the front panel unit 14 determines the sensor(s) (detector(s)) to be used for determining the location of the vehicle in accordance with the attached/detached condition of the front panel unit 14. The base unit 10 and cradle unit 12 are assigned respective ID numbers (identification numbers) that are stored in the nonvolatile EEPROMs 10r and 12f.

Figure 11:
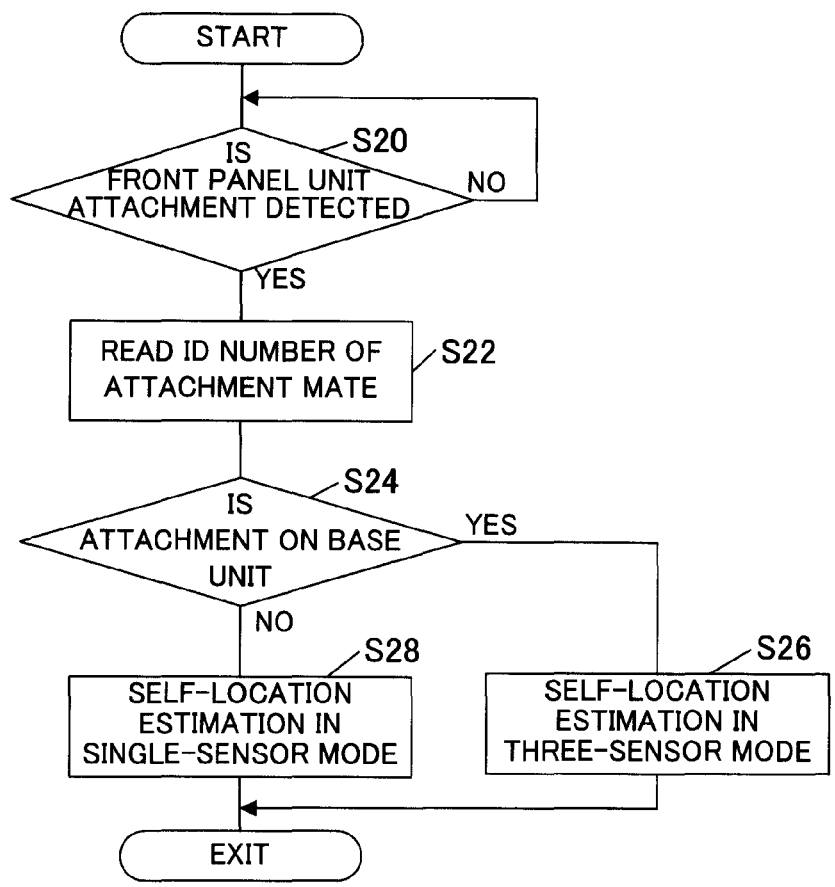
FIG. 11 is a flowchart showing processing of determining sensor(s) whose output is to be used for determining the location of the vehicle, which is similarly executed by the navigation microcomputer of the front panel unit following the processing of FIG. 10.

FIG. 11 is a flowchart showing this processing, which, as in the case of FIG. 10, is executed by the navigation microcomputer 14m.

Now to explain, in S20 it is checked whether attachment of the front panel unit 14 in which it itself is accommodated was detected. Since communication with the system microcomputer 10i or the cradle microcomputer 12b through the signal line becomes possible upon attachment, the navigation microcomputer 14m thereby judges whether its own attachment in the base unit 10 was detected.

When the result in S20 is YES, the program goes to S22, in which the ID number (identification number) of the attachment mate (mounting mate) is read, to S24, in which it is checked whether the attachment was on the base unit 10, and when the result is YES, to S26, in which self-location estimation is done in three-sensor mode, i.e., (vehicle A) self-location is determined from the outputs of three sensors (GPS signal receiver 20, wheel speed sensor 22 and the gyrosensor).

When the result in S24 is NO, it means that the attachment was on the cradle unit 12, so the program goes to S28, in which self-location estimation is done in single-sensor mode, i.e., (vehicle B) self-location is determined from the output (GPS signals) of the GPS signal receiver 20.

Thus, a configuration is adopted that determines the sensor(s) to be used in determining the location of the vehicle A or B in accordance with the attached/detached condition of the front panel unit 14, thereby making it possible to improve the flexibility of sensor use in location determination.

Next, the storage of the vehicle location will be explained.

As set out in the foregoing, multiple base units, e.g., base units 10-1, 10-2, 10-3 . . . , are sometimes provided, but in such a case, it is possible that the location data of the vehicle A stored in the nonvolatile memory (FLASH memory 14o) in the front panel unit 14 is data of another vehicle, i.e., of the vehicle A2, A3 or the like. As a result, cases arises in which there is no choice but to confirm by receiving GPS signals and determining the location after mounting.

Figure 12:
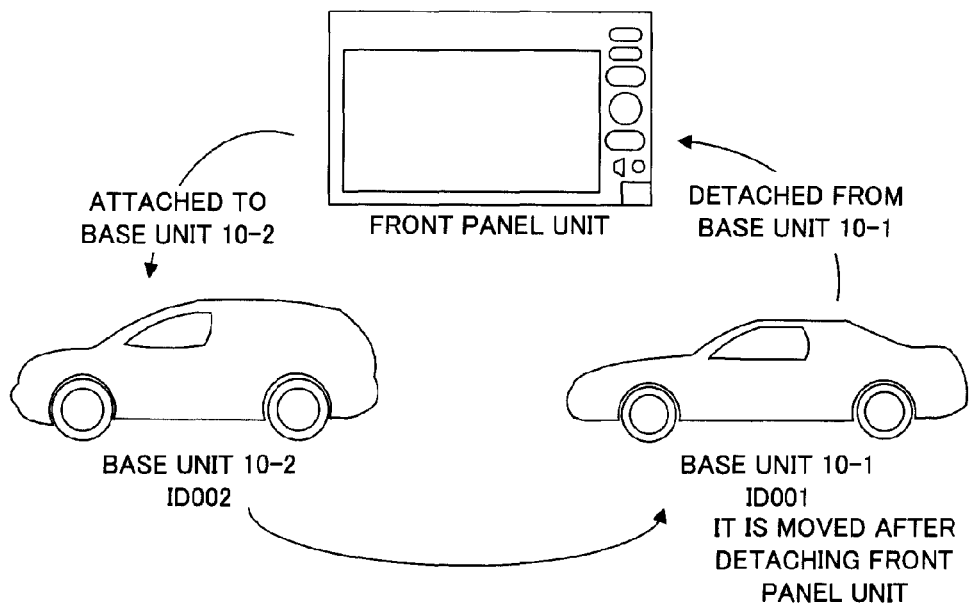
FIG. 12 is an explanatory view showing the location information immediately before removal, which is stored together with an ID number in nonvolatile memories of the base unit and front panel unit.

Therefore, in the navigation apparatus according to this embodiment, when multiple base units 10 are provided, the location information immediately before removal and the ID number are together stored in the EEPROM (nonvolatile memory) 10r of the base unit 10, as shown at the left of FIG. 12. On the other hand, as shown at the right of FIG. 12, when the front panel unit 14 is detached from the base unit 10, the ID number of the base unit and the location data are stored as a pair, and when the front panel unit 14 is attached to the same base unit again, the location information at the time of detachment is read from that ID number and used as the location information. This makes it possible to prevent use of wrong location information.

Further, irrespective whether there is a single or multiple base units 10, if the front panel unit 14 should be detached and attached again after the vehicle A has moved, cases may arise in which the current location and the location information stored in the front panel unit 14 differ.

Therefore, in conducting the processing in the navigation apparatus according to this embodiment, a flag FLV indicating that the vehicle A moved while the front panel unit 14 was detached is included in the EEPROM 10r of the base unit 10.

Figure 13:
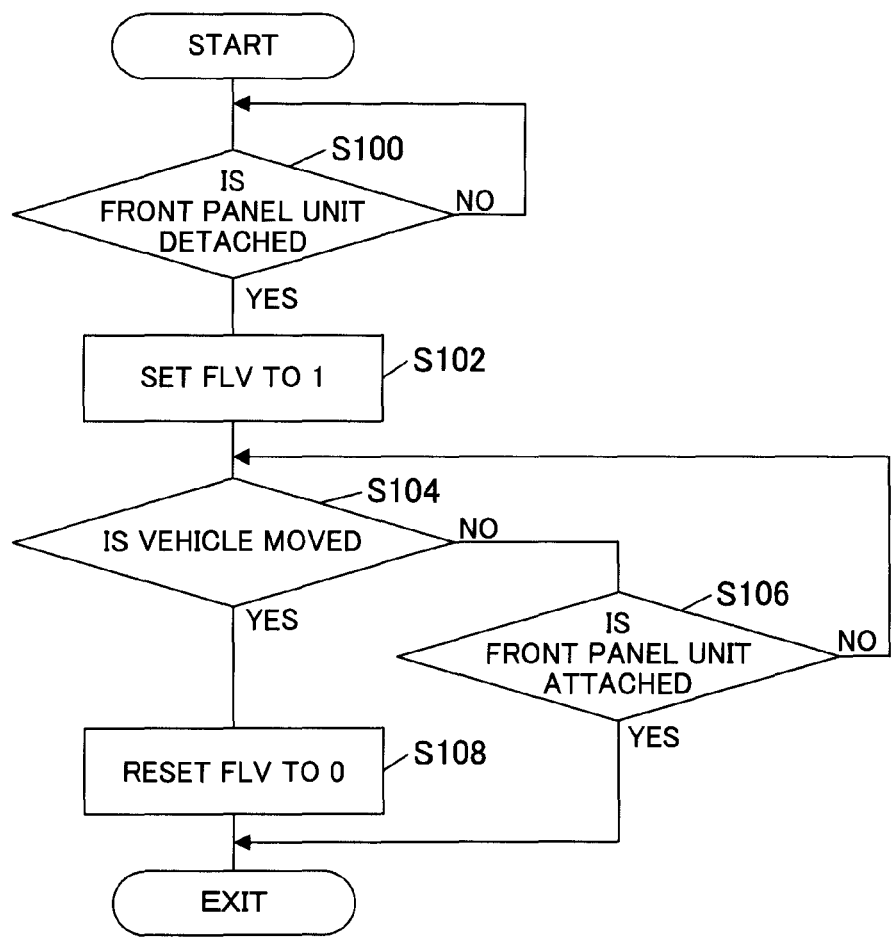
FIG. 13 is a flowchart showing processing of determining whether the vehicle moved while the front panel unit was detached, which is executed by a system microcomputer of the base unit.

FIG. 13 is a flowchart showing this processing. The illustrated processing is executed by the system microcomputer 10i.

Now to explain, in S100, it is checked whether the front panel unit 14 was detached. This is judged from the output of the panel detection switch. When the result in S100 is YES, the program goes to S102, in which the bit of the flag FLV is set to 1, and to S104, in which it is checked whether the vehicle has moved. This is judged from the output of the wheel speed sensor 22.

When the result in S104 is NO, the program goes to S106, in which it is checked whether the front panel unit 14 was attached again, and when the result is NO, returns to S104. On the other hand, when the result in S104 is YES, the program goes to S108, in which the bit of the flag FLV is reset to 0.

Note that when the result in S104 is NO and the result in the ensuing S106 is YES, S108 is skipped because, at any rate, the vehicle has not moved.

Figure 14:
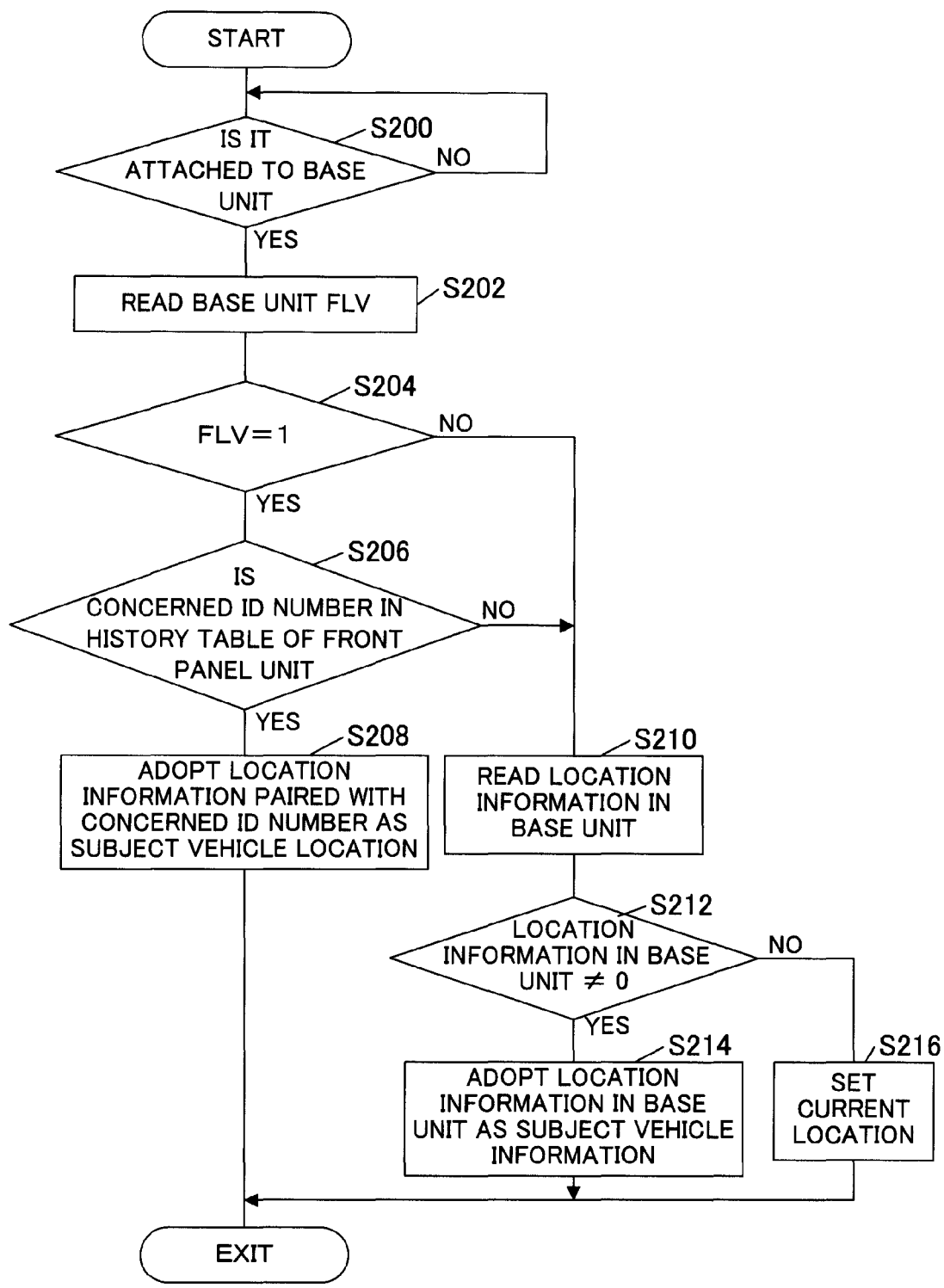
FIG. 14 is a flowchart showing processing executed by the navigation microcomputer 14m responsive to the processing of FIG. 13.

FIG. 14 is a flowchart showing the processing executed by the navigation microcomputer 14m responsive to the processing of FIG. 13.

Now to explain, in S200, whether or not attached to the base unit 10 is continuously checked based on the output of the panel detection switch, and when the result is YES, the program goes to S202, in which the flag FLV stored in the EEPROM 10r of the base unit 10 is read, and to S204, in which it is checked whether the bit of the flag FLV is set to 1.

When the result in S204 is YES, it means that the vehicle has not moved, so the program goes to S206, in which it is checked whether the ID number of the base unit 10 concerned is in a history table (shown in FIG. 12), and when the result is YES, to S208, in which the location information paired with the ID number concerned is adopted as the subject vehicle location.

On the other hand, when the result in S204 is NO, the program goes to S210, in which the location information stored in the base unit 10 is read. The same applies when the result in S206 is NO. Next, in S212, it is checked whether the read information is not 0 data, and when the result is YES, the program goes to S214, in which the read information is adopted as the subject vehicle location, and when it is NO, the program goes to S216, in which current location setting is conducted (described later).

Specifically, after the front panel unit 14 is detached, the system microcomputer 10i of the base unit 10 writes the location information contained in the GPS signals and the mounted vehicle orientation information to the EEPROM 10r every time the power is turned OFF. When GPS location determination is not complete at this time, it writes 0 data.

In the front panel unit 14, when, after the installation in the base unit 10, the navigation microcomputer 14m determines by referring to the flag FLV that the location information stored therein is unusable, it reads the location information stored in the base unit 10 and, provided that it is not 0 data, adopts it as the subject vehicle location (S204, S210, S212, and S214). Therefore, even when the once-detached front panel unit 14 is reattached after the vehicle has moved, it can nevertheless function as a navigation apparatus that indicates the subject vehicle location.

However, in even such a case, it will be impossible at some locations, such as in an underground parking lot, to acquire GPS signals upon attachment of the front panel unit 14, leaving no choice other than to adopt 0 data for the subject vehicle location. When the subject vehicle location is lost, it is impossible to calculate a route to the destination or to predict the arrival time or the like.

So, in the navigation apparatus according to this embodiment, it is made possible in the case where the subject vehicle location was lost, and only in such case, to set the subject vehicle location in the same manner as setting a destination (S216). Specifically, the user is allowed to define the subject vehicle location by selecting it from address search results or nearby landmark information, thereby enabling destination setting, route calculation and the like.

After this, the user cannot be offered guidance until GPS signals are received and the location is determined while driving on a road, but once GPS signals are picked up, that location can be used as the subject vehicle location to guide the user by autonomous navigation.

Next, navigation information storage and information sharing between base units will be explained.

In a navigation apparatus, the practice in determining self-location is to use vehicle-specific parameters. Namely, since the sensitivity of the gyrosensor 24 varies with attachment condition, the angle at the time of attachment is measured and stored in memory and sensor output is corrected using the stored value during navigation.

In the autonomous navigation, the calculation of traveled distance uses the distance traveled during one pulse output by the wheel speed sensor 22 (Distance Per Pulse). This DPP is calculated from the traveled trajectory derived from the GPS signals and the number of wheel speed sensor 22 pulses and is constantly updated.

Since the attachment angle of the gyrosensor 24 and the traveled distance DPP are parameters specific to the vehicle in which the navigation apparatus is installed, this embodiment stores these parameters in the EEPROM 10r of the base unit 10. In this arrangement, if the user replaces only the base unit 10 with a new one, such information must be once saved to a memory card or the like and then copied to the new base unit 10.

Taking this point into account, the navigation apparatus according to this embodiment once saves the information (parameters) stored in the EEPROM 10r of the base unit 10 to the front panel unit 14 side and copies it to the new base unit 10 in accordance with the instructions of the navigation microcomputer 14m. As a result, the information can be shared when the base unit is replaced.

Next, explanation will be made regarding interference between wireless modules and the like, i.e., the device priority and the like.

In the navigation apparatus according to this embodiment, since the front panel unit 14 is equipped with two wireless modules, i.e., the BT module 14q and the wireless module 14x, interference is liable to occur between the two. For example, when the vehicle is backing up (when rear camera images are being displayed), if a DVD playback request is made or the mobile telephone with hands-free microphone receives a call, device operations may interfere. Note that, although the main function is receiving signals, the wireless module 14x is also capable of transmission and, in addition, conducts mutual confirmation processing and communication quality confirmation processing.

So, priority is established and the devices are operated accordingly. FIG. 15 is an explanatory diagram of this processing. In this diagram, events, i.e., operations of the reverse gear switch 26, mobile telephone with hands-free microphone and the DVD, are represented on the horizontal axis, and associated states, i.e., vehicle backing up, phone engaged, and DVD playing, are represented on the vertical axis.

Figure 16:
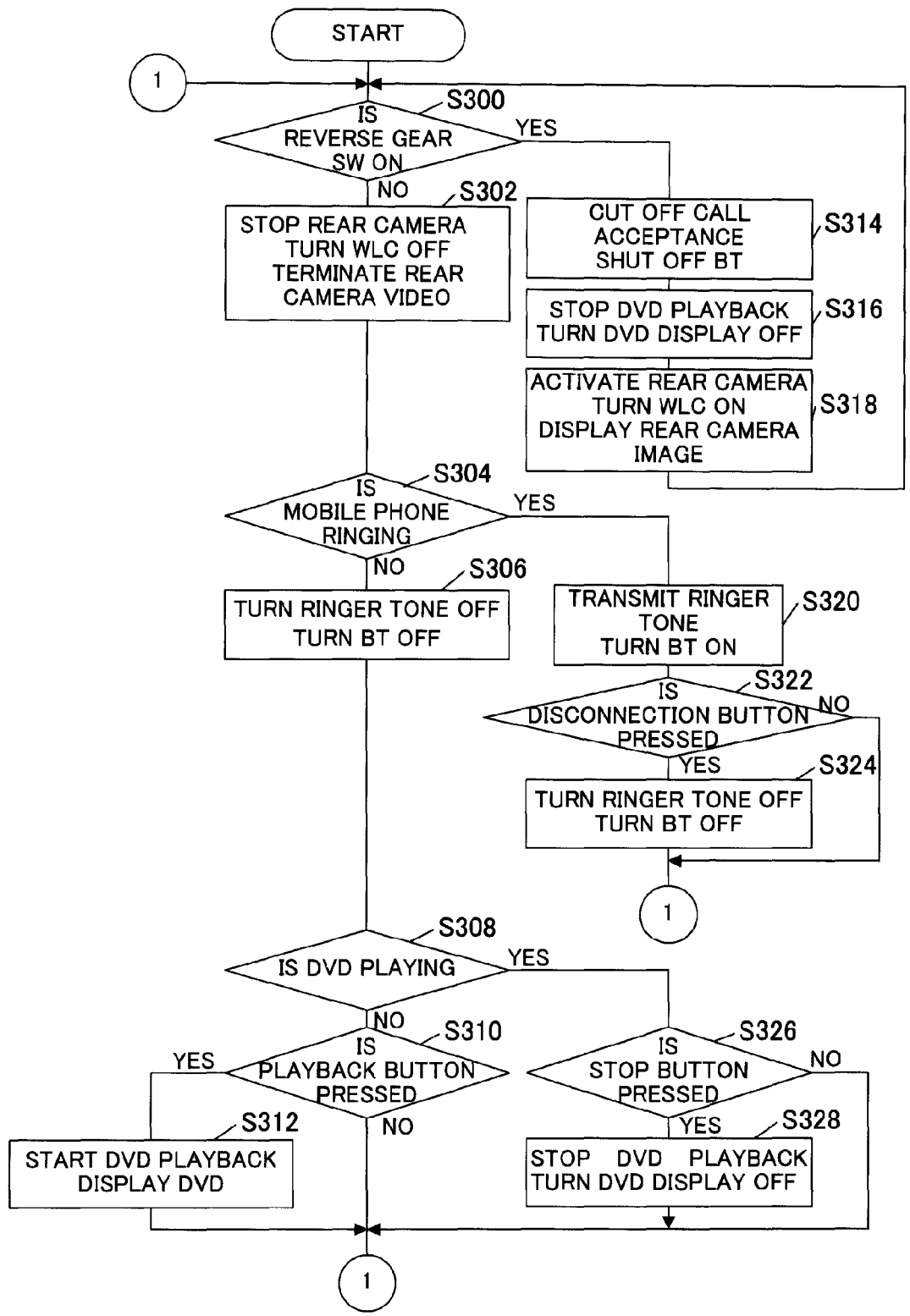
FIG. 16 is a flowchart showing processing executed by the navigation microcomputer of the front panel unit based on FIG. 15.

FIG. 16 is a flowchart showing processing executed by the navigation microcomputer 14m based on FIG. 15.

Turning to an explanation in line with FIG. 16 made with reference to FIG. 15, first, in S300, it is checked whether the reverse gear switch 26 is outputting an ON signal, i.e. whether the vehicle is about to back up, and when the result is NO, the program goes to S302, in which the operation of the rear camera (Wireless Camera) is stopped, the WLC (Wireless Camera) wireless function is turned OFF, and the video from the rear camera is terminated.

Next, in S304, it is checked whether the mobile phone is engaged (ringing), and when the result NO, the program goes to S306, in which the ringer function of the hands-free system is turned OFF and the function of the BT module 14q is turned OFF (i.e., put in standby mode).

Next, in S308, it is checked whether the DVD is playing, and when the result is NO, the program goes to S310, in which it is checked whether the playback button (on the touch panel 14s) is pressed, and when the result is YES, goes to S312, in which DVD playback is started and DVD video is displayed on the liquid crystal panel 14b. This is because the vehicle is not about to back up, so rear camera images are unnecessary.

On the other hand, when the result in S300 is YES, the program goes to S314, in which mobile telephone call acceptance (ringing) is cut off and the BT module 14q is shut off because it is also unnecessary (i.e., wireless signal send/receive is discontinued; note that power shutdown is acceptable as the means for this). Next, in S316, DVD playback is stopped and DVD display is turned OFF, whereafter the program goes to S318, in which the rear camera is activated, the WLC function is turned ON and rear camera images are displayed, upon which the program returns to S300.

Further, when the result in S304 is YES, the program goes to S320, in which the ringer tone is transmitted through the onboard speaker and the BT module 14q for audio send/receive is turned ON (i.e., is activated). Next, in S322, it is checked whether the disconnect button (on the touch panel 14s) is pressed, and when the result is YES, the program goes to S324, in which the ringer tone is turned OFF and the BT module 14q is turned OFF because it is unnecessary. Note that when the result in S322 is NO, S324 is skipped.

Further, when the result in S308 is YES, the program goes to S326, in which it is checked whether the stop button (on the touch panel 14s) is pressed, and when the result is YES, it goes to S328, in which DVD playback is stopped and the DVD display is turned OFF. Note that when the result in S326 is NO, S328 is skipped.

Owing to the processing shown in FIGS. 15 and 16, display of the rear camera images taken rearward of the vehicle A is ensured, so that the user can back up while watching them. Further, device operation does not interfere.

Next, the FM transmitter 12e of the cradle unit 12 will be explained.

The FM transmitter 12e in the cradle unit 12 shown in FIG. 7 is a means that operates using the navigation microcomputer 14m to transmit the music contents or voice guidance in the memory card 14r of the front panel unit 14 over the onboard speaker. However, the output level of radio wave transmitters is regulated by the radio laws and regulations of individual countries, which makes transmission at weak power inevitable. Therefore, when driving near a radio station, noise occurs owing to the effect of its radio waves.

Therefore, in the navigation apparatus according to this embodiment, a database of local radio station frequencies is stored in the EEPROM 12f of the cradle unit 12, and the cradle microcomputer 12b finds a vacant frequency for the respective travel segments, or for the entire travel route to the destination, and displays the frequency on the liquid crystal panel 14b of the front panel unit 14.

If the user tunes the frequency of the car receiver (car audio) thereto, music contents or voice guidance can be outputted from the onboard speaker for listening. This makes it possible to offer the user the music contents or voice guidance with minimal noise. The cradle microcomputer 12b outputs the music contents and voice guidance through the FM transmitter 12e to output it from the onboard speaker.

Note that while the FM transmitter installed in the cradle unit 12 in this embodiment, it is also acceptable to provide it in the base unit 10.

Next, the GUI shown in FIG. 8 will be explained further.

As was explained regarding FIG. 8, in the case of operating equipment that, like a navigation apparatus, has many functions and many settings, use of the GUI enables the user to visually understand the operating method, and therefore, the navigation apparatus according to this embodiment incorporates into the navigation microcomputer 14m of the front panel unit 14 shown in FIG. 6 a configuration enabling GUI customization, whereby the functions are executed through the user's operation of the touch panel 14s.

Figure 17:
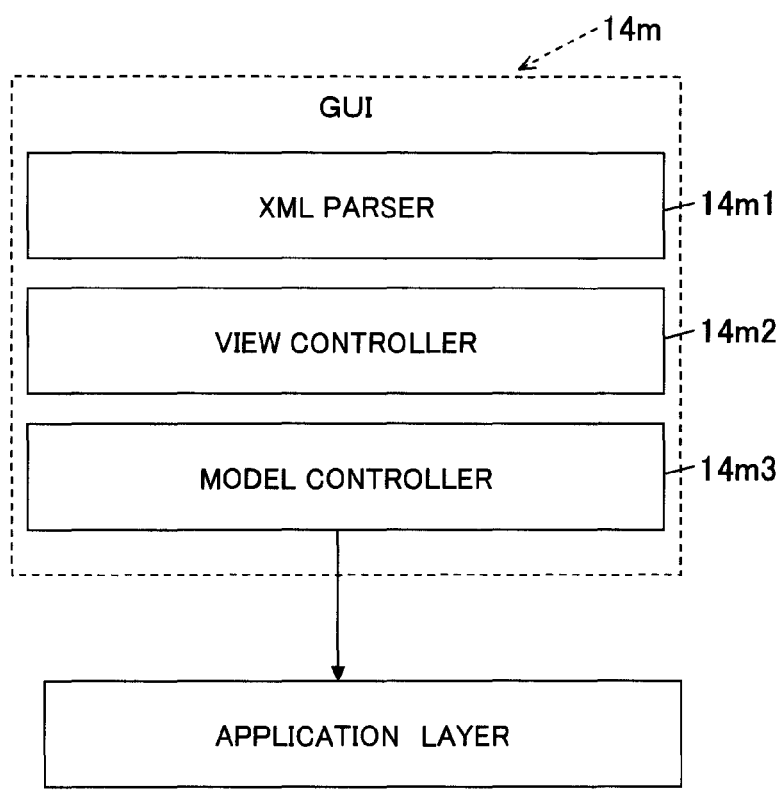
FIG. 17 is a block diagram of the configuration of GUI (function) shown in FIG. 8.

The configuration of the GUI (functions) of FIG. 8 is shown in FIG. 17. Turning once again to the explanation of the GUI, the parser 14m1 defines the screen configuration, specifically it defines the button locations, button file names, button names and the like, and detects button touches. The VIEW controller 14m2 defines the menu configuration, i.e., it determines which skin to display when a button is pressed. The MODEL controller 14m3 sends the selected function message to the application layer. The application layer executes commands sent from the GUI.

While configuring in the manner shown in FIG. 17 enables the user to visually understand the operating method, the number of menus increases with increasing number of functions, with the result that the menu hierarchy becomes deeper. Therefore, in order to execute a function, the user has to select menu buttons many times to select a desired function, which is rather liable to be more complicated. From the user's viewpoint, more narrowed down functions may be easier to use.

The menu screen is composed of skin files defining screen configurations prepared for the individual screens (background file name, button display location, button file name, button name and the like) and the messages issued when the individual buttons are selected, and bitmap files prepared for the individual constituent elements (menu buttons) of the menu screens called from skin files. These skin files and bitmap files are stored in the nonvolatile memory (FLASH memory) 14o, and the navigation microcomputer 14m displays them on the liquid crystal panel 14b utilizing the XML parser function.

The XML parser 14m1 sends a message to the VIEW controller 14m2 in response to a user operation. The VIEW controller 14m2 examines the message contents, switches the displayed skin file, and, if necessary, sends a command request to the MODEL controller 14m3. The MODEL controller 14m3 checks the requested command and sends an operation command to the application layer. In this structure, switching the skin file changes the menu screen. The skin files are written in XML or other such language.

Figure 18:
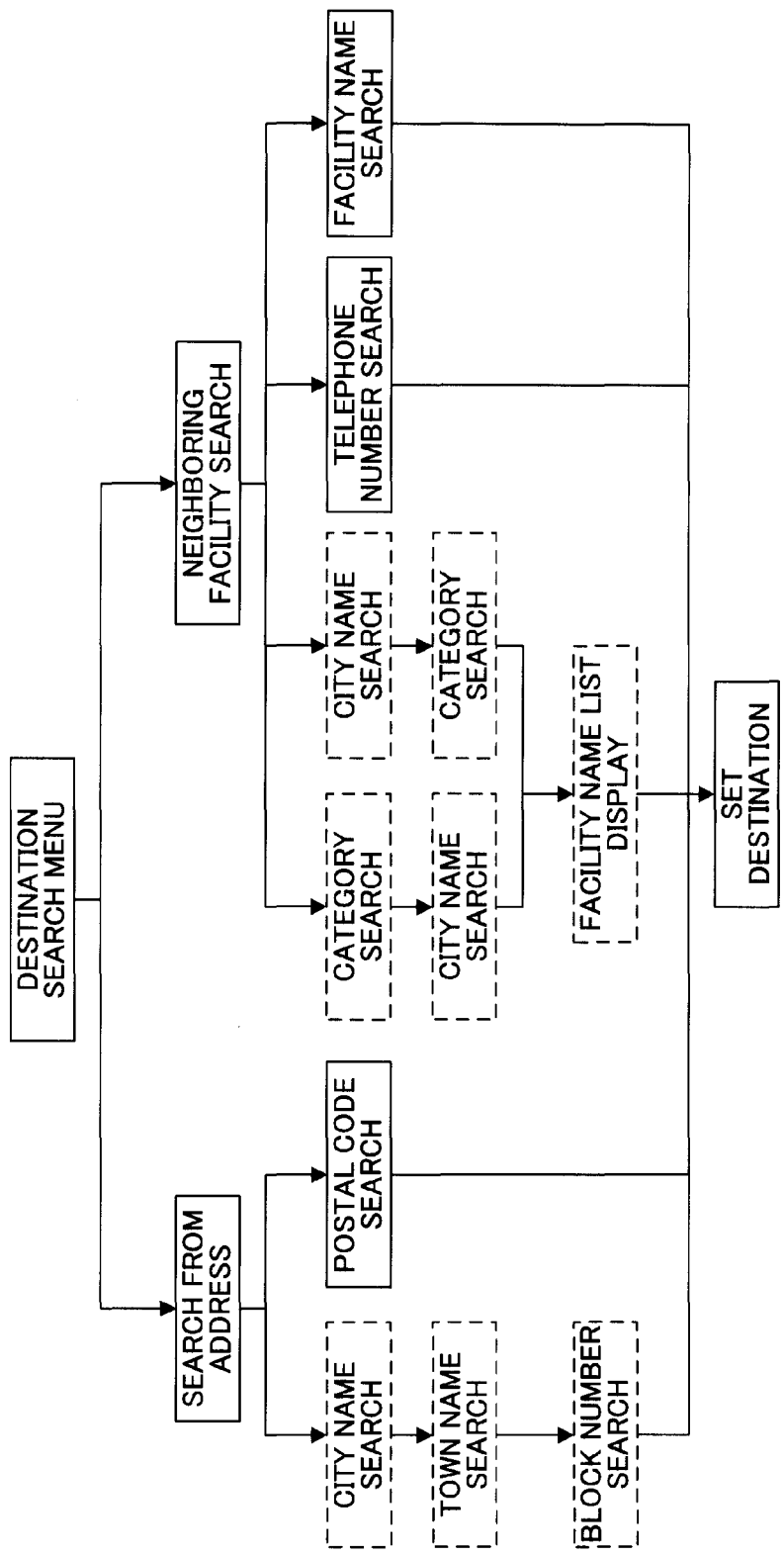
FIG. 18 is an explanatory view showing processing of function deleting in the configuration in FIG. 17.

When customizing the GUI, the practice is to compile skins and controllers in a menu configuration composed of all original functions, then compile skin files without the keys desired to be deleted from the menu screen and thereafter replace the skin files concerned. This makes it possible to disable the display of menus and issuance of application commands at and below the deleted buttons and to delete their functions. An example thereof is shown in FIG. 18 (deleted portions are indicated in broken lines).

Further, when the skin files are written in a language such as XML, the button layout and button shapes can be modified simply by changing the skin file description. Adopting this method makes customization possible simply by replacing the skin files, without need to rewrite the program.

The original skin files are loaded into nonvolatile memory and the skin files desired to be changed are put in the memory card 14r or the like. The user puts the desired skin files in the memory card 14r, and after turning on the power, replaces skins by selecting files in the memory card 14r using the initial settings skin select menu. In this case, however, the user must select the preferred skin(s) at every power-on, so that setting becomes necessary every time the vehicle engine is turned off. Conversely, if the skins are fixed, only a particular user can benefit from the skin change.

The navigation apparatus according to this embodiment is configured so that each of the front panel unit 14, base unit 10 and cradle unit 12 includes a nonvolatile memory and a microcomputer, and the memories store unique ID numbers by which they authenticate one another at the attachment process. In other words, the respective microcomputers can each identify the other at the time of attachment. Further, since the base unit 10 and cradle unit 12 are fastened to the vehicle, the front panel unit 14 can also identify the vehicle on which it itself is attached based on the ID number.

In view of the recent tendency for each person to own his or her own car and for every car to have one particular user, a situation is likely to arise in which the base unit 10 or the cradle unit 12 is installed in every car and only a single front panel unit 14 is kept on hand for shared use. So skin file names are in advance defined in the single front panel unit 14 in correspondence to the ID numbers of the base units 10 and cradle units 12 in which attachment is expected, the ID number of the mate is read at mounting, and changeover of the skin files in the memory card 14r is done automatically.

Figure 19:
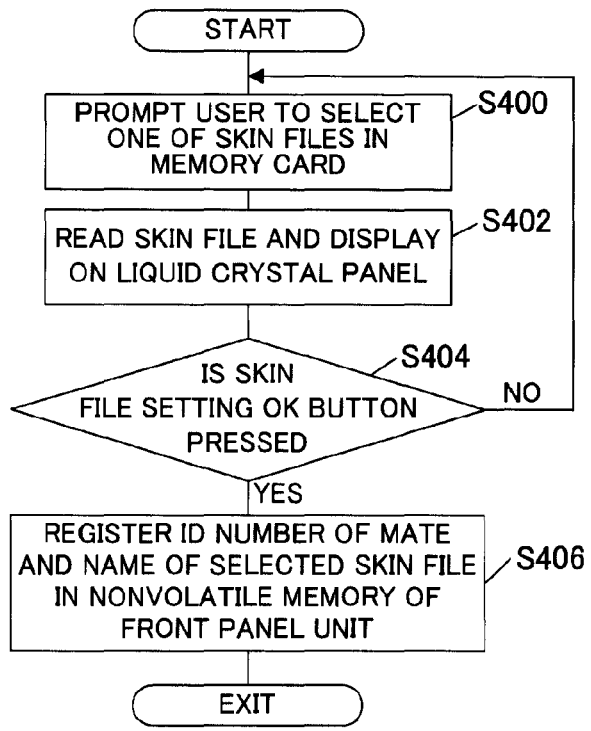
FIG. 19 is a flowchart showing skin file setting processing in the case where a single front panel unit is shared by users of multiple vehicles.
Figure 20:
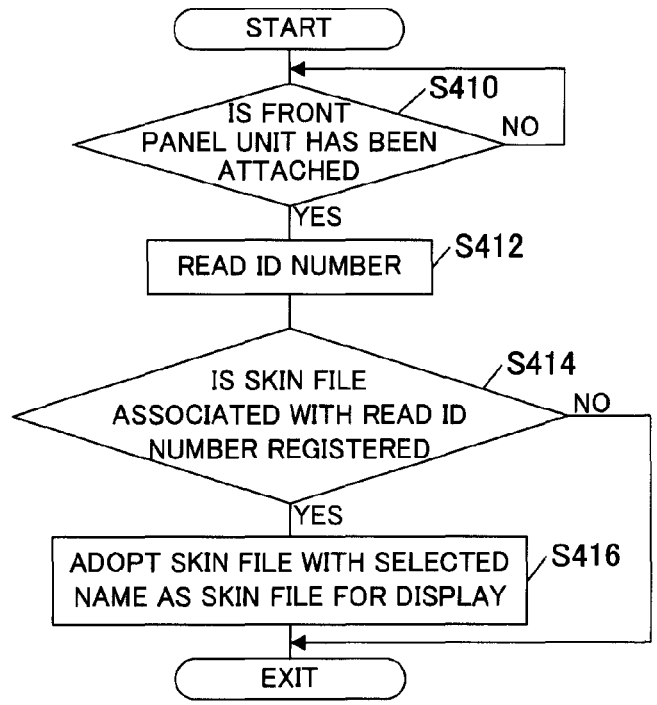
FIG. 20 is a flowchart showing processing of skin file automatic selection, which is executed following the processing of FIG. 19.

FIGS. 19 and 20 are flowcharts showing this processing. The processing shown is executed by the navigation microcomputer 14m.

The processing shown in FIG. 19 is premised on multiple types of skin files being stored in the memory card 14r of the navigation microcomputer 14m of the front panel unit 14, and is executed in response to operation by the individual users of multiple vehicles when the front panel unit 14 is attached to the base unit 10 or cradle unit 12.

Now to explain, in S400, the user is prompted to select one of the multiple types of skin files stored in the memory card 14r, whereafter the program goes to S402, in which the selected skin file is read and displayed on the liquid crystal panel 14b. Next, the program goes to S404, in which it is checked whether the user pressed the skin file setting OK button, thereby confirming whether the user accepts the setting, and when the result is NO, the program returns to S400.

On the other hand, when the result is YES in S404, the program goes to S406, in which the ID number of the mate, i.e. of the base unit 10 or cradle unit 12 of the vehicle owned by the user who initiated the operation, is inputted, and the inputted ID number and name of the selected skin file are registered (stored) in the nonvolatile (FLASH) memory 14o of the front panel unit 14.

Note that in this case registration (storage) in the EEPROM 10r in the base unit 10 or the EEPROM 12f in the cradle unit 12, or in a separately provided nonvolatile memory, is also applicable.

Moreover, it is also possible to enhance the reliability of the apparatus by, in addition to providing the front panel unit 14 with the separate nonvolatile memory, also providing the base unit 10 or cradle unit 12 with a nonvolatile memory, registering (storing) the ID number of the mate, the selected skin file, the name thereof and the like in both nonvolatile memories, and when one set of data cannot be used or is not correct, using the data on the side that is not abnormal, and when both are abnormal or their data are different, preferentially using the data of the nonvolatile memory of the front panel unit 14.

The processing shown in FIG. 20 is executed when, following completion of the processing shown in FIG. 19, the detached front panel unit 14 is attached to the base unit 10 or cradle unit 12.

Now to explain, in S410, the fact of the front panel unit 14 having been attached to the base unit 10 or cradle unit 12 is confirmed, whereafter the program goes to S412, in which the ID number of the mate (the base unit 10 or cradle unit 12) in which the front panel unit is attached is read, and to S414, in which it is checked whether a skin file with a name associated with the read ID number is registered. When the result in S414 is NO, the remaining processing step is skipped, and when it is YES, the program goes to S416, in which the skin file with the selected name stored in the memory card 14r is adopted as the skin file for display, more exactly, is automatically selected.

This allows automatic switching of the skin file by the user to match the vehicle upon mounting. Since, however, it is of course possible to imagine a case in which every car does not have its own particular user, the menu is always provided with a button for switching to the original menu.

Although the GUI change procedure presumes user selection from among a number of GUIs prepared beforehand, it is also conceivable for users themselves to customize the GUI. In such case, the menu organization procedure will involve selection of a button not in use, so that there is a risk of inadvertently deleting a required button.

Therefore, this embodiment is configured so that each button is assigned a non-erasable attribute in the button delete procedure, and the attribute is unfailingly checked in the delete-button selection step, thereby making it impossible to delete buttons that must not be deleted. Further, frequently used and functionally indispensable buttons known to be undeletable from the start are assigned hard keys so they will not be displayed during menu editing.

Figures 21, 22:
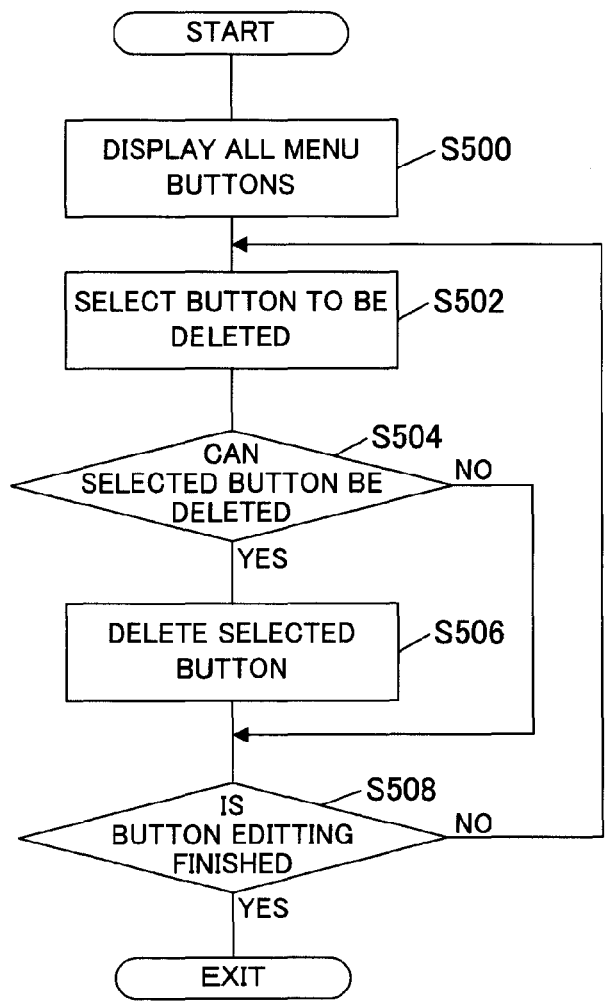
FIG. 21 is an explanatory view showing examples of buttons that must not be deleted in function deleting of FIG. 18.
FIG. 22 is a flowchart of processing executed in accordance with FIG. 21.

FIG. 21 shows examples of buttons that must not be deleted (undeletable buttons). FIG. 22 is a flowchart of the foregoing.

Now to explain, all menu buttons are displayed in S500 and the program goes to S502 in which the user is asked to select a button to be deleted. The program then goes to S504, in which it is checked whether the selected button can be deleted, and when the result is YES, to S506, in which the selected button is deleted. Note that when the result in S504 is NO, the processing of S506 is skipped.

Next, the program goes to S508, in which it is checked whether the button editing is finished, and when the result is NO, the program returns to S502, and when it is YES, the program is terminated. To be more specific, after the processing for each button deletion is completed, the message "Quit button editing?" is displayed along with YES and NO buttons, and when the NO button is pressed by the user, the result in S508 is NO and the program returns S502, and when the YES button is pressed, the result in S508 is YES and the program closes.

Owing to the foregoing configuration, the operation becomes easy for the user because the use of the GUI gives the user a visual understanding of the operation method, and user operation can be made still easier by narrowing down the menu buttons as required. Further, even when users customize the GUI on their own, they do not end up inadvertently deleting necessary buttons.

Next, explanation will be made regarding the installation site of the TV tuner 10q.

When TV viewing functions are incorporated in the navigation apparatus, use needs to be restricted. In the case where the TV viewing functions are all centralized in the front panel unit 14, the practice would be to send the output of the wheel speed sensor 22 for discriminating whether the vehicle is actually driving from the base unit 10 to the navigation microcomputer 14m and for the navigation microcomputer 14m to use it to turn the TV viewing functions ON and OFF.

However, in such a configuration, if the signal line (serial data line) interconnecting the base unit 10 and front panel unit 14 should be hacked and a pseudo signal sent to the front panel unit 14, the turned-off TV viewing function would be turned on.

In the navigation apparatus according to this embodiment, should the TV tuner 10*q* be installed in the front panel unit 14, the image signal received by the vehicle outside antenna would routed through the base unit 10 to the front panel unit 14. In this case, it would not be possible to obtain an image signal of good quality because the broadcast waves acquired from the antenna, being high in frequency and weak, are easily affected by the impedance of the path and ambient noise. In particular, owing to the connection of the front panel unit 14 and the base unit 10 through the connector 10*e*, the image signal is affected also by occurrence of contact loss.

Further, if a TV antenna should be installed directly on the front panel unit 14 in the condition being attached to the base unit 10, the size of the front panel unit which is determined based on the base unit size is decreased by a portion of the antenna, so that the size of the liquid crystal panel (display) 14*b* would have to be reduced.

Taking these points into consideration, the TV tuner 10*q* of the navigation apparatus in accordance with this embodiment is installed in the base unit 10 as shown in FIG. 6. Specifically, since the system microcomputer 10*i* of the base unit 10 receives the output of the wheel speed sensor 22, whether the vehicle is driving can be easily determined, the operation of the TV tuner 10*q* can be restricted when driving is found to be in progress.

In other words, since the determination of whether the vehicle is driving and the restriction of TV tuner 10*q* operation are completed inside the base unit 10, it becomes difficult to disable the TV view restriction by hacking from the outside.

Further, the effect of path impedance and noise can be mitigated to enhance picture quality by transferring the image signal to the front panel unit 14 after converting it to a digital signal in the TV tuner 10*q*.

Next, explanation will be made regarding theft of the front panel unit 14.

The front panel unit 14 is detachable from the base unit 10 and therefore susceptible to theft. Therefore, in this embodiment, theft of the front panel unit 14 is deterred by registering in the EEPROM 10*r* of the base unit 10 or the EEPROM 12*f* of the cradle unit 12 their ID numbers (identification numbers) and checking whether they agree therewith, specifically, by making the front panel unit 14 which has not been registered in advance inoperable.

Figure 23:
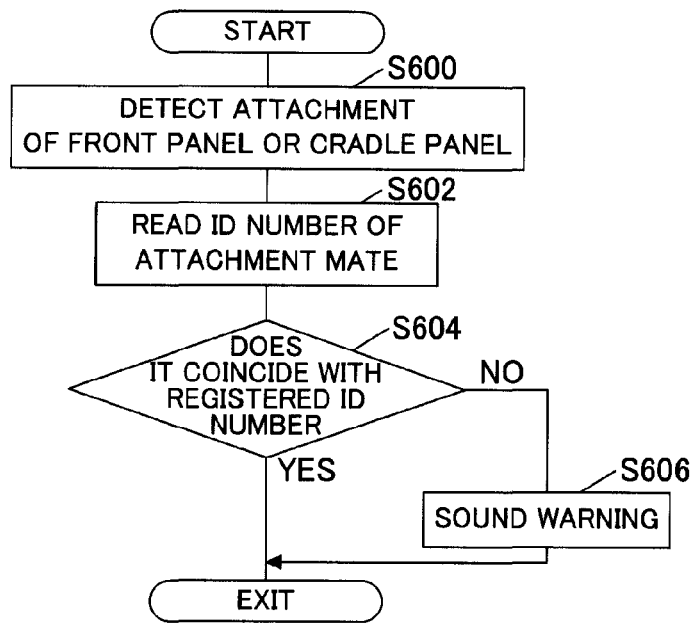
FIG. 23 is a flowchart of processing of determining theft of the front panel unit, which is executed by the navigation microcomputer.

FIG. 23 is a flowchart of this processing showing processing executed by the navigation microcomputer 14*m*.

Now to explain, in S600, it is checked whether attachment of the front panel unit 14 in which it itself is accommodated was detected. Since communication with the system microcomputer 10*i* or the cradle microcomputer 12*b* through the signal line becomes possible upon attachment, the navigation microcomputer 14*m* thereby judges whether its own attachment was detected.

Next, the program goes to S602, in which the ID number (identification number) of the attachment mate (mounting mate) is read, to S604, in which it is checked whether it coincides with the ID number registered in advance, skips the remaining processing step when the result is YES, and when it is NO, goes to S606, in which it sounds a warning. Note that simultaneously with or instead of this, current location information is automatically notified to a previously designated telephone number through the BT module 14*q*.

While the microcomputer (navigation microcomputer) 14*m* does the processing of FIG. 23 discussed above, the navigation microcomputer 14*m* also executes various other processing such as the processing shown FIG. 10. And the system microcomputer 10*i* of the base unit 10 executes processing such as that shown in FIG. 13. The same is true of the cradle microcomputer 12*b* of the cradle unit 12.

The processing by these microcomputers will explained hereinafter with reference to FIGS. 24 to 26.

Figure 24:
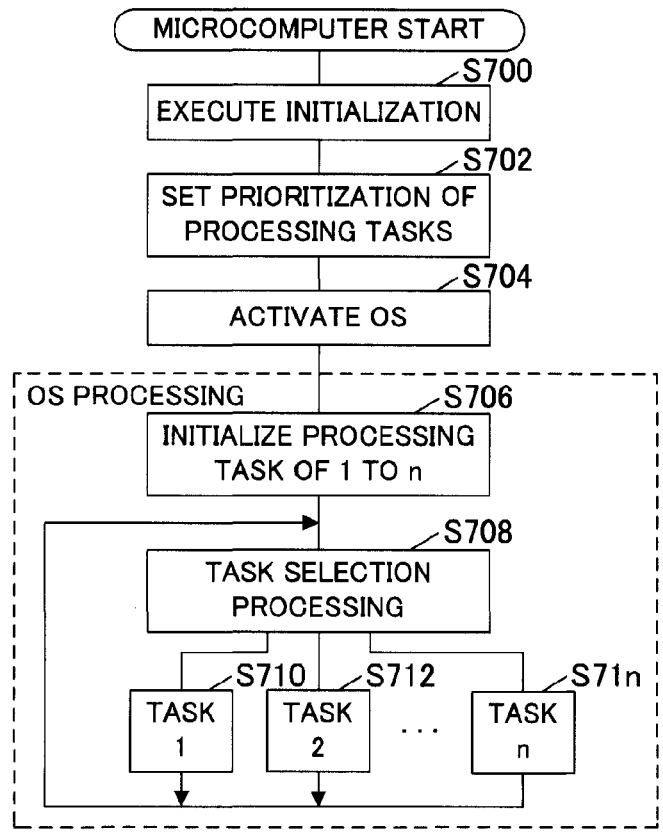
FIG. 24 is a flowchart showing a main routine for conducting the processing shown in FIG. 10, etc., which is executed by the microcomputers such as the navigation microcomputer of the front panel unit.

FIG. 24 is a flowchart showing a main routine for conducting the aforesaid processing by these microcomputers, namely, the navigation microcomputer 14*m*, system microcomputer 10*i* and cradle microcomputer 12*b*, e.g., the processing (hereinafter called "processing task") shown in FIG. 10 etc. conducted by the navigation microcomputer 14*m*.

The illustrated routine starts when the ignition key is turned ON to supply operating power from the vehicle A (or vehicle B) power supply (battery), whereupon initialization is executed first (S700) and the prioritization of 1 to n processing tasks is set in a predetermined RAM area (S702).

Next, the OS (operating system) is activated (S704), all processing tasks are initialized (S706), and standby mode is entered in a task selection step (S708). In this standby mode, when an event flag is set by an interrupt explained later, the event corresponding to the set event flag (one of S710 to S71*n*) is executed. When the processing of the corresponding event is finished, the routine returns to the task selection processing (S708), in which the standby mode is maintained until an event flag is set by the next interrupt.

Specifically, in the task selection step (S708), whether or not an event flag has been set is monitored through the interrupt processing (explained later), and when setting is detected, the processing task corresponding to the set event flag is executed. Note that when interrupts conflict, processing tasks are executed in accordance with the priority set in S702. The processing from initialization (S706) to event (one of S710 to S71*n*) corresponds to OS processing.

Figure 25:
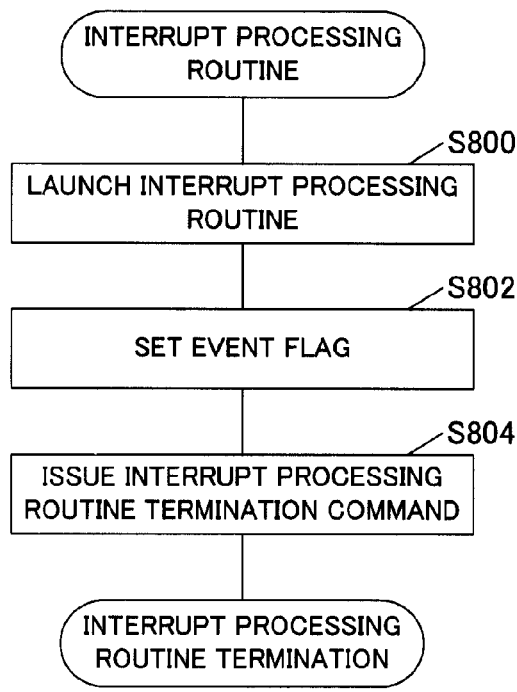
FIG. 25 is a flowchart showing interrupt processing routine described in the processing of FIG. 24.
Figure 26:
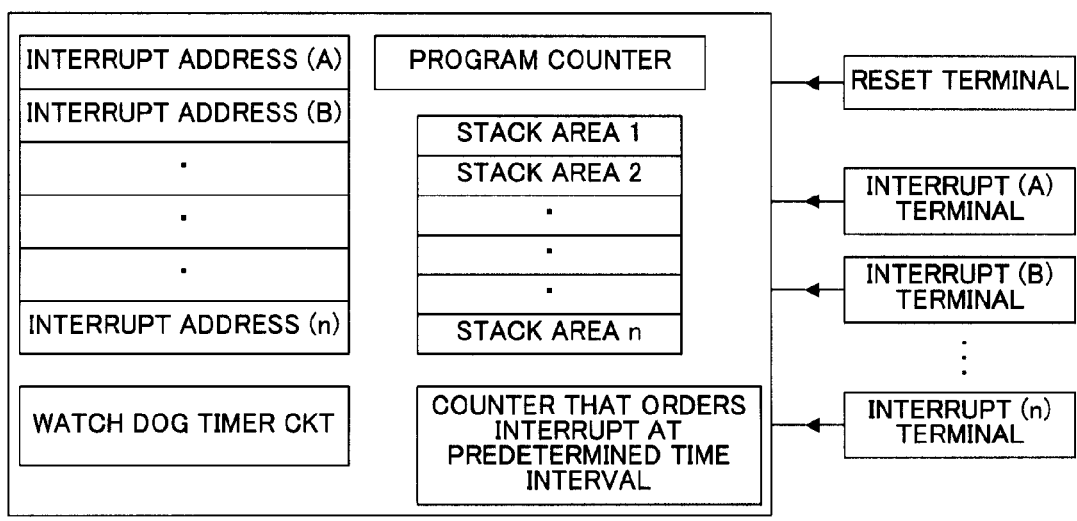
FIG. 26 is a block diagram showing the hardware configuration of the microcomputers used for the interrupt processing of FIG. 25.

FIG. 25 is a flowchart showing the aforesaid interrupt processing routine and FIG. 26 is a block diagram showing the hardware configuration of the microcomputers used for the interrupt processing.

Broadly divided, the interrupt processing consists of a hardware-based processing portion independently processed with no relationship to software later loaded into the microcomputer and an interrupt processing routine portion that is software loaded into the individual microcomputers, and when data or a trigger signal is inputted to an interrupt terminal (A to n) of FIG. 26, or a trigger signal is produced in a counter that orders interrupts at predetermined time intervals, the aforesaid hardware-based processing is commenced in the microcomputer, and the contents of the different registers containing the data that is currently in use for or has been processed by OS processing are transferred to respective stack areas (1 to n).

Then, after the current value of the program counter has been transferred to the stack area, the value written to the interrupt address (A to n) corresponding to the interrupt terminal to which the data or the like was inputted is written into the program counter. Owing to this rewriting of the program counter value, the program currently being processed is suspended (held) and the interrupt processing routine of FIG. 25 is launched.

In the interrupt processing routine of FIG. 25, first the interrupt processing routine (S800) is launched, next the flag of the event flag corresponding to the terminal etc. that received the interrupt is set (S802), and finally an interrupt processing routine termination command is issued (S804), thereby terminating the interrupt processing routine.

Upon issuance and execution of this interrupt processing routine termination command, the hardware-based processing is restarted in the microcomputer and the values transcribed to the stack areas (1 to n) at the time of suspension are written back to the original registers, whereafter the program counter value temporarily saved at the time of suspension is rewritten to the program counter from the stack area, thereby terminating the interrupt processing sequence and restoring the state immediately before the interrupt. From this point onward, the suspended (held) program being executed up to immediately before the interrupt is executed again.

Next, the antennas will be explained.

Figure 27:
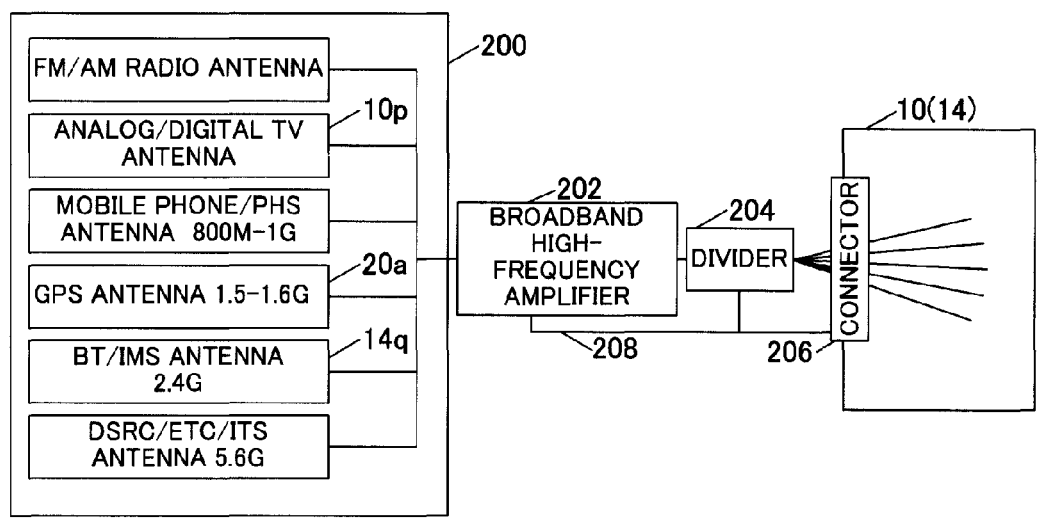
FIG. 27 is an explanatory view of the configuration of an antenna shown in FIG. 6, etc.

As can be seen from FIGS. 6 and 7, the navigation apparatus according to this embodiment has numerous antennas. Aside from the navigation apparatus, the vehicle is equipped with an FM/AM radio, which also has an antenna. Although it is possible to install the antennas independently, this embodiment uses a unitary film antenna 200, as shown in FIG. 27.

The output of the film antenna 200 is amplified by a broadband high-frequency amplifier 202, whereafter it is divided by a divider 204 and forwarded through a connector 206 for input to the base unit 10 (or front panel unit 14 or cradle unit 12). The symbol 208 designates a power line. The film antenna 200 is stuck on one among, for example, the windshield 18, rear window, roof outer surface, rearview mirror or the like of the vehicle.

Figure 28:
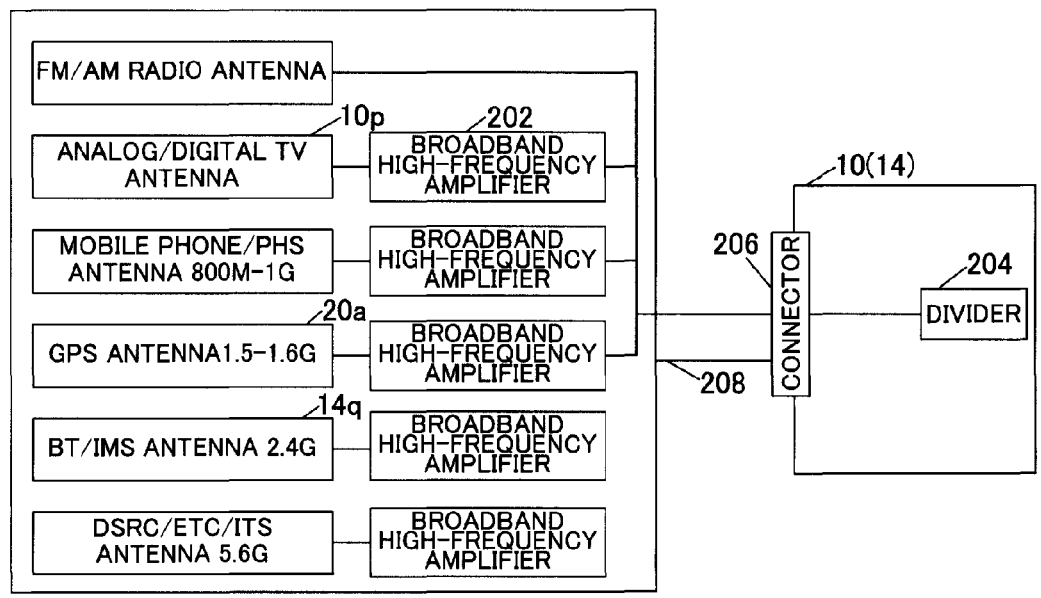
FIG. 28 is a similar explanatory view of another configuration of an antenna shown in FIG. 6, etc.

Otherwise, as shown in FIG. 28, it is possible to internally install the high-frequency amplifier 202 for each antenna 200 and send the outputs to the base unit 10 through the connector 206 and divider 204. In this case, no high-frequency amplifier 202 needs to be connected to the FM/AM radio antenna because its wavelength is relatively long.

Figure 29:
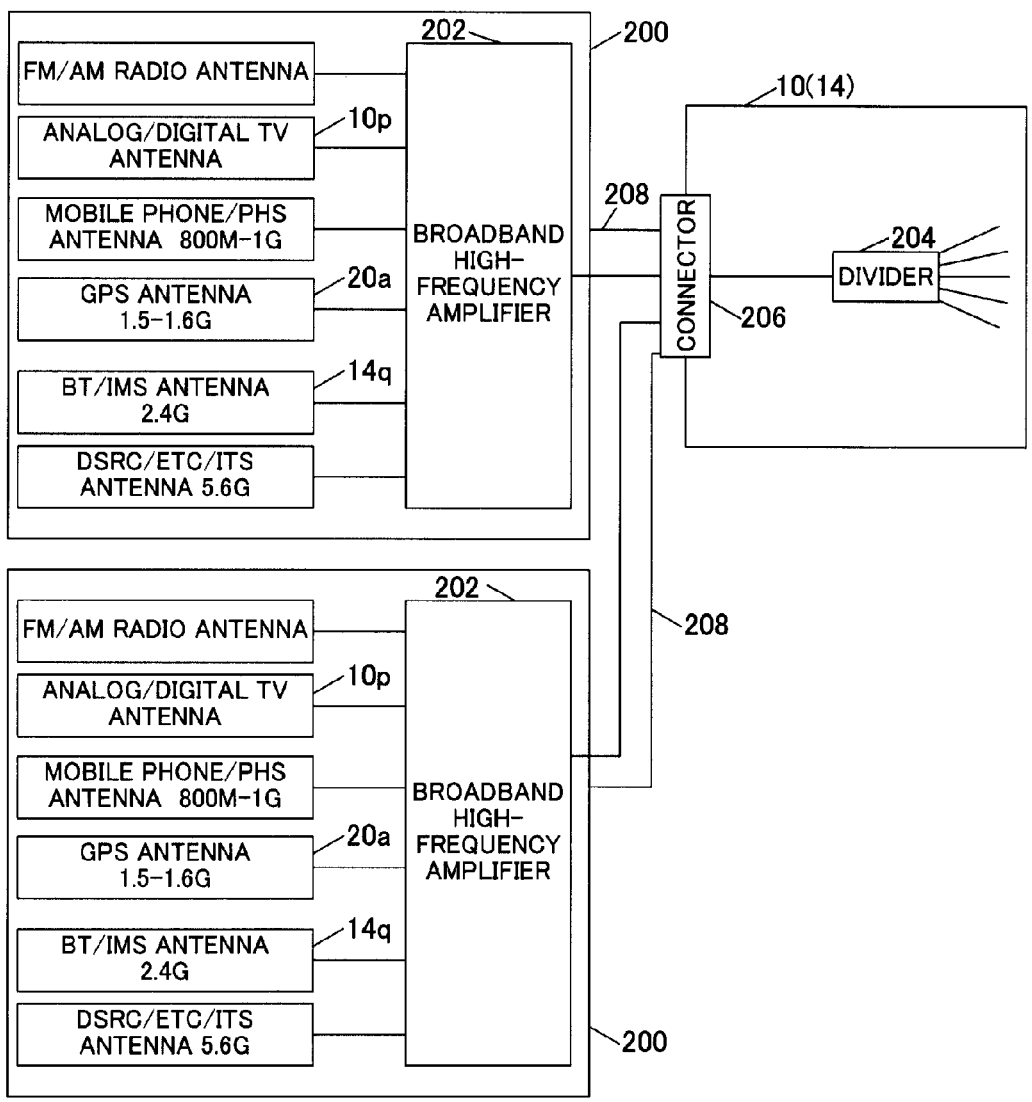
FIG. 29 is a similar explanatory view of still another configuration of an antenna shown in FIG. 6, etc.

Otherwise, as shown in FIG. 29, it is possible to provide multiple film antennas 200, stick them on different ones of the windshield 18, rear window, roof outer surface, rearview mirror or the like, and use the divider 204 of the base unit 10 or the like to select the one with higher electric field strength.

As set out in the foregoing, this embodiment is configured to have a navigation apparatus having: a base unit 10 that is fastenable to a vehicle and is equipped with at least a microcomputer (system microcomputer 10i); and a front panel unit 14 that is attachable to and detachable from the base unit 10 and is equipped with at least a liquid crystal panel (display) 14b displaying map data and a microcomputer (navigation microcomputer 14m) performing a navigation function to indicate a determined location of the vehicle on the map data, characterized in that: there are provided with at least three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; and the microcomputer of the front panel unit 14 determines the detector or detectors to be used for determining the location of the vehicle in accordance with output condition of the detector or detectors (S10 to S18). With this, the sensor(s) used for location determination can be optimally selected to enhance the accuracy of vehicle location determination, while the flexibility of sensor use in location determination can be improved in the point that the location determination is not necessarily restricted to use of the three sensors.

Further, and similarly, ease of use as a navigation apparatus can be improved by the adoption of the detachable format enabling the front panel unit 14 to be detached from the base unit 10 and mounted in another vehicle or to be taken home for input of destinations, routes and the like.

Further, it is configured to have a navigation apparatus having: a base unit 10 that is fastenable to a vehicle and is equipped with at least a microcomputer (system microcomputer 10i); and a front panel unit 14 that is attachable to and detachable from the base unit and is equipped with at least a liquid crystal panel (display) 14b displaying map data and a microcomputer (navigation microcomputer 14m) performing a navigation function to indicate a determined location of the vehicle on the map data, characterized in that: there are provided with at least three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; and the microcomputer of the front panel unit 14 determines the detector or detectors to be used for determining the location of the vehicle in accordance with attached/detached condition of the front panel unit 14 (S20 to S28). With this, the flexibility of sensor use in location determination can be improved.

Further, and similarly, ease of use as a navigation apparatus can be improved by the adoption of the detachable format enabling the front panel unit 14 to be detached from the base unit 10 and mounted in another vehicle or to be taken home for input of destinations, routes and the like.

Further, the apparatus further includes: a cradle unit 12 that is fastenable to the vehicle and is equipped with at least a microcomputer (cradle microcomputer) and a receiver 20 receiving a GPS signal, wherein the front panel unit 14 is attachable to and detachable from the cradle unit 12; and the microcomputer of the front panel unit 14 determines the location of the vehicle using outputs of the three sensors (detectors) when the front panel unit 14 is attached to the base unit 10 (S24, S26), and determines the location of the vehicle using only the GPS signal when the front panel unit 14 is attached to the cradle unit 12 (S24, S28). With this, in addition to the foregoing effects, the cradle unit 12 that is attachable/detachable with the front panel unit 14 and determines location using GPS signals is provided, thereby further enhancing ease of use as a navigation apparatus.

Note that the gyrosensor 24 is required for location determination in the three-sensor mode. Should the gyrosensor 24 be built into the front panel unit 14, the sensitivity might change and accuracy decline owing to looseness of front panel unit attachment or inclination resulting from tilt adjustment of the front panel unit 14. Size reduction of the front panel unit 14 itself might also be affected. In addition, if the output of the wheel speed sensor should be transferred to the front panel unit 14, the number of contact terminals between the front panel unit 14 and base unit 10 would increase.

As a countermeasure, it would be possible to build the gyrosensor 24 into the base unit 10 and transfer the gyro data and the output of the wheel speed sensor 22 to the navigation microcomputer 14m through the serial communication line after reading them in with the system microcomputer 10i in the base unit 10. However, in this case the routing through the system microcomputer 10i would give rise to a delay in information transfer to the navigation microcomputer 14m and shift the timing relative to the GPS data acquisition.

The data of the three sensors is inherently location information, distance traveled information and direction information at each timing and must be simultaneously acquired and processed. Discrepancy in acquisition times affects location accuracy.

However, the navigation apparatus according to this embodiment is configured to install also the GPS signal receiver 20 on the base unit 10 side and so that the location information obtained from the GPS is, along with the gyro data and the output of the wheel speed sensor 22, also sent to the navigation microcomputer 14m after being sorted and integrated by the system microcomputer 10i, whereby the delay caused by data transfer through the system microcomputer 10*i* is the same for all of the data of the three sensors, so that no such inconvenience occurs.

Note that also in this configuration, if the CPU processing capacity of the system microcomputer 10*i* is high, the self-location estimation and/or navigation functions can also be conducted on the system microcomputer 10*i* side. However, in order to display the display map data compiled by the system microcomputer 10*i* on the liquid crystal panel 14*b* of the front panel unit 14, the image data compiled by the system microcomputer 10*i* would either be sent to the navigation microcomputer 14*m* without modification and converted to an image signal for display by the navigation microcomputer 14*m* or be converted to an analog image signal by the system microcomputer 10*i* and transferred to the front panel unit 14, to be displayed on the liquid crystal panel 14*b*.

Since the map data is sent as color image data of one to five images per second, the data transfer volume is large. If transfer over a parallel bus should be attempted, the data lines (signal lines) between the front panel unit 14 and base unit 10 would increase considerably.

Further, in the case of transfer over serial data lines, the data signal lines would be monopolized by the map data transfer owing to the great map data transfer volume, so that the transfer of other information to be transferred from the system microcomputer 10*i* to the navigation microcomputer 14*m* would become slow.

Further, in the case of moving the navigation functions from the navigation microcomputer 14*m* to the system microcomputer 10*i*, while it would be possible to lower the CPU capacity of the navigation microcomputer 14*m*, microcomputers with processing capability on a level enabling navigation would have to be incorporated as the system microcomputer 10*i* and cradle microcomputer 12*b*, which would increase the system upgrade cost. Moreover, some users are likely to buy more than one cradle unit 12, so that concentrating highly intelligent functions in the front panel unit 14 will lower their total costs.

In consideration of the foregoing, this embodiment is configured to complete navigation functions in the navigation microcomputer 14*m* of the front panel unit 14 and use the system microcomputer 10*i* of the base unit 10 to conduct peripheral equipment control.

Note that even in the case where the GPS signal receiver 20 is connected to the front panel unit 14, the gyrosensor 24 is installed in the base unit 10 and the wheel speed sensor 22 is connected to the base unit 10, the different signal data can be synchronized by the methods set out below.

1. The system microcomputer 10*i* integrates the outputs of the gyrosensor 24 and wheel speed sensor 22 and sends them to the navigation microcomputer 14*m* together with timestamp data. The navigation microcomputer 14*m* also stores the GPS data to memory paired with GPS data acquisition time timestamp data and conducts self-location estimation by combining data of the same time as the timestamp received from the system microcomputer 10*i*.

2. A system that maintains fixed intervals among the time of wheel speed sensor 22 and gyrosensor 24 output acquisition by the system microcomputer 10*i*, the time of transfer of these data to the navigation microcomputer 14*m*, and the time of transfer of the GPS data from the GPS signal receiver 20 to the navigation microcomputer 14*m*, are designed, and the different sensor signal acquisition times in the navigation microcomputer 14*m* are managed and synchronized.

Further, as explained in the foregoing, this embodiment is configured to have a navigation apparatus having: a base unit 10 that is fastenable to a vehicle and is equipped with at least a microcomputer (system microcomputer 10*i*); and a front panel unit 14 that is attachable to and detachable from the base unit and is equipped with at least a liquid crystal panel (display) 14*b* displaying map data and a microcomputer (navigation microcomputer 14*m*) performing a navigation function to indicate a determined location of the vehicle on the map data, characterized in that: the location of the vehicle is determined by using at least one of three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; and a short-range transceiver module (BT module) 14*q* including an antenna 14, and a dedicated image data receiving module (wireless module) 14*x* are installed on the front panel unit, i.e., on the back thereof.

Since the dedicated image data receiving module (wireless module) 14*x* is thus installed in the front panel unit 14 which is also installed with the navigation microcomputer 14*m* operating the liquid crystal panel 14*b* in this manner, images can be displayed without time lag.

The frequency band of the wireless module, such as the wireless module 14*x*, in the reception status is 2.4 G except for a first short period during which the mutual confirmation processing and communication quality confirmation processing are conducted with the other party of communication. The rear camera images of the vehicle are transmitted by using 60% to 80% of the usable bandwidth in the above band and ensuring communication speed of 5 to 6 Mbps, so as to assure the necessary image quality level and high-speed communication, and in the case of the front camera, its images are transmitted by using 25% to 35%, i.e., ⅓ of the bandwidth, such that the respective communications of the rear camera and front camera are both become available for actual use simultaneously.

Further, while making the communication speed of the rear camera greater than that of the front camera, 10% to 15%, i.e., ¹⁄₁₀ of the band of the BT (Bluetooth) communication is remained for the BT communication, thereby ensuring stable high-speed communication, as minimizing the mutual interference.

As described with respect to the processing of FIG. 16, when the rear camera is used, it is preferable not to utilize the BT communication of the BT module 14*q* positioned near the wireless module 14*x* at the back of the front panel unit 14 to prevent noise induced by communication delay from occurring in the wireless module 14*x*.

Further, when the front camera images are received by using the wireless module 14*x*, the images may be stored in the FLASH memory 14*o*, as being displayed in the liquid crystal panel of the front panel unit 14, for checking the driving condition or persons and vehicles (including motorcycles and bicycles) passing in front of the subject vehicle, after driving.

Since memory capacity is limited for retaining records for a long period, in the cases where recording is conducted for a predetermined period before and after light-on and light-off of a head lump, winker or the like, where one to several (about 30) image(s) is automatically recorded at regular intervals (every 0.2 to 1 second) like a picture taken by a still camera when detecting a person (his/her face) or a vehicle (its license number, characteristic shape) through a software, and where 70% of the capacity of the FLASH memory 14*o* is occupied, data may be transferred to an external record medium over a mobile phone line at every preset time period and all or at least 50% or more of the data recorded in the FLASH memory 14*o* may be deleted.

Further, if it is within a communication range of a communication device connected to the front camera or rear camera of the vehicle, it becomes possible to monitor a parking space from the inside of a house and record it by removing the front panel unit 14 from the vehicle and attach it to the cradle unit 12 installed in the house.

In addition, the dedicated short-range transceiver module (BT module) 14q including the antenna 14p is installed on the front panel unit 14, more specifically, on the back thereof, so that communication with the mobile telephone hands-free microphone in the vehicle is facilitated.

Further, as explained in the foregoing, the embodiment is configured to have a navigation apparatus having: a base unit 10 that is fastenable to a vehicle and is equipped with at least a microcomputer (system microcomputer 10i); and a front panel unit 14 that is attachable to and detachable from the base unit and is equipped with at least a liquid crystal panel (display) 14b displaying map data and a microcomputer (navigation microcomputer 14m) performing a navigation function to indicate a determined location of the vehicle on the map data, characterized in that: the location of the vehicle is determined by using at least one of three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; the microcomputer (system microcomputer 10i) of the base unit retains the location of the vehicle A even after the front panel unit 14 is detached from the base unit 10; and the microcomputer (navigation microcomputer 14m) of the front panel unit 14 determines the location of the vehicle based on driving condition of the vehicle (S200 to S216 of FIG. 14).

In addition to the foregoing effects, this makes it possible by using the stored data to immediately determine location even when the front panel unit 14 is detached, insofar as the vehicle is not driving, while use of incorrect location data can be prevented because it is possible to avoid using the stored data when the vehicle has moved.

Further, as explained in the foregoing, the embodiment is configured to have a navigation apparatus having: a base unit 10 that is fastenable to a vehicle and is equipped with at least a microcomputer (system microcomputer 10i); and a front panel unit 14 that is attachable to and detachable from the base unit and is equipped with at least a liquid crystal panel (display) 14b displaying map data and a microcomputer (navigation microcomputer 14m) performing a navigation function to indicate a determined location of the vehicle on the map data, characterized in that: the location of the vehicle is determined by using at least one of three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; a control program of the microcomputer (navigation microcomputer 14m) of the front panel unit is configured to include a graphical user interface (GUI) function that is provided with a liquid crystal panel displaying a menu and a touch panel overlaid thereon on the liquid crystal panel 14b to be pressed by a user to execute a specified function, an application function that executes the operation selected through the graphical user interface function, and a platform function that defines at least processing times for the functions; and an undeletable button is displayed on the touch panel (FIG. 21, S500 to S508 of FIG. 22).

This facilitates user operation by giving the user a visual understanding of the operation method and simplifies user operation even further by making it possible to narrow down the menu buttons as required. Further, even when users customize the GUI on their own, they do not end up inadvertently deleting necessary buttons. In addition, modification in accordance with the vehicle model is also facilitated.

Further, as explained in the foregoing, the embodiment is configured to have a navigation apparatus having: a base unit 10 that is fastenable to a vehicle and is equipped with at least a microcomputer (system microcomputer 10i); and a front panel unit 14 that is attachable to and detachable from the base unit and is equipped with at least a liquid crystal panel (display) 14b displaying map data and a microcomputer (navigation microcomputer 14m) performing a navigation function to indicate a determined location of the vehicle on the map data, characterized in that: the location of the vehicle is determined by using at least one of three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; and a tuner (TV tuner 10q) that receives a TV image is provided in the base unit 10 such that an output (TV image signal) of the tuner is transferred from the microcomputer of the base unit to the front panel unit.

Since the system microcomputer 10i of the base unit 10 thus receives the output of the wheel speed sensor 22, it becomes possible to easily determine whether the vehicle is driving, and restrict the operation of the TV tuner 10q when driving is found to be in progress. Moreover, since the determination of whether the vehicle is driving and the restriction of TV tuner 10q operation are completed inside the base unit 10, it can make difficult to disable the TV view restriction by hacking from the outside.

Further, the effect of path impedance and noise can be mitigated to enhance picture quality by transferring the image signal to the front panel unit 14 after converting it to a digital signal in the TV tuner 10q, thereby making it possible to improve picture quality.

Further, as explained in the foregoing, the embodiment is configured to have a navigation apparatus having: a base unit 10 that is fastenable to a vehicle and is equipped with at least a microcomputer (system microcomputer 10i); and a front panel unit 14 that is attachable to and detachable from the base unit and is equipped with at least a liquid crystal panel (display) 14b displaying map data and a microcomputer (navigation microcomputer 14m) performing a navigation function to indicate a determined location of the vehicle on the map data, characterized in that: the location of the vehicle is determined by using at least one of three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle, and characterized by: an FM transmitter 12e; and means (EEPROM 12f) for storing a database of frequencies of local radio stations in a region where the vehicle is traveling, wherein a vacant frequency for the region where the vehicle is traveling is searched and the searched frequency is displayed on the liquid crystal panel 14b of the front panel unit 14.

More specifically, the navigation apparatus includes a cradle unit 12 that is attachable to or detachable from the front panel unit and is equipped with at least a microcomputer (cradle microcomputer 12b), wherein the FM transmitter 12e is installed in the cradle unit 12; and the microcomputer (cradle microcomputer 12b) of the cradle unit 12 searches a vacant frequency for a region where the vehicle is traveling and displays the searched frequency on the liquid crystal panel 14b of the front panel unit 14.

As a result, by tuning the receiver to the frequency, the user can listen to music contents and voice guidance outputted from the onboard speaker and can listen to the music contents and voice guidance in a low-noise condition.

Here, the aforementioned dashboard panel integrated cradle (assigned by symbol 32) will be explained.

Figure 30:
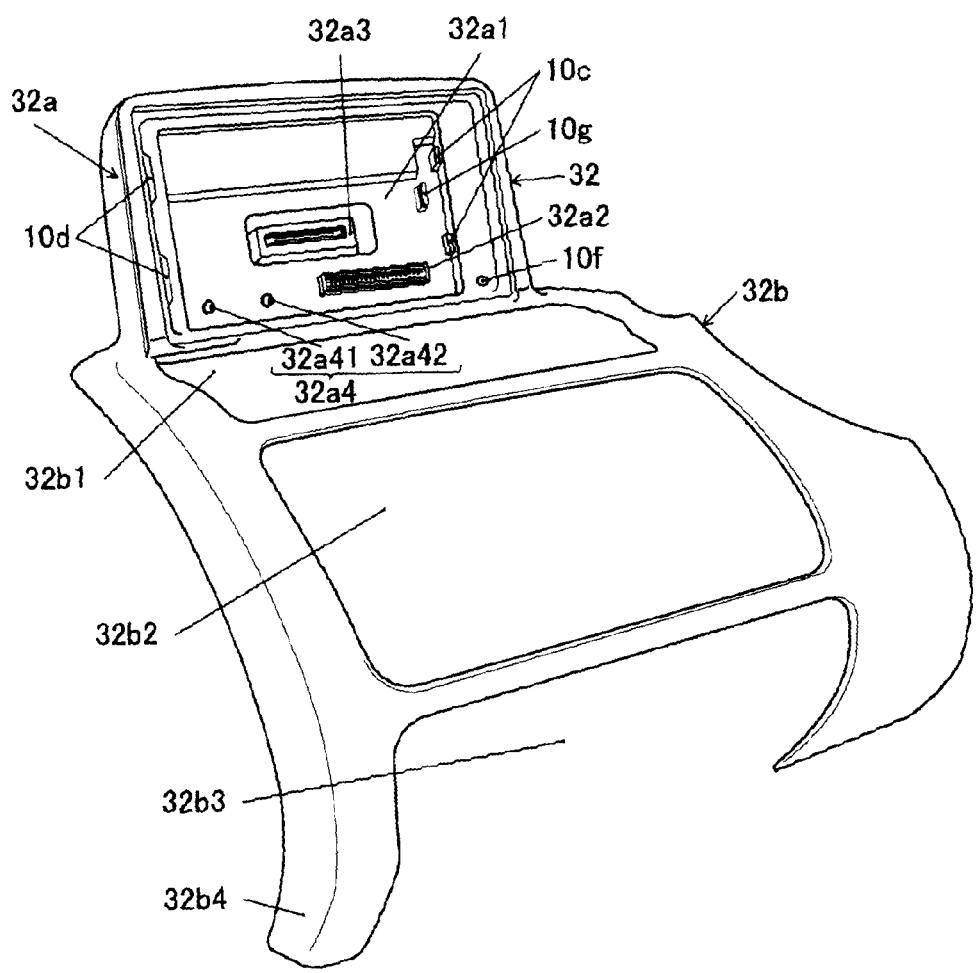
FIG. 30 is a perspective view of a dashboard panel integrated cradle for indicating an alternative example of the cradle unit attached with the front panel unit shown in FIG. 1.
Figure 31:
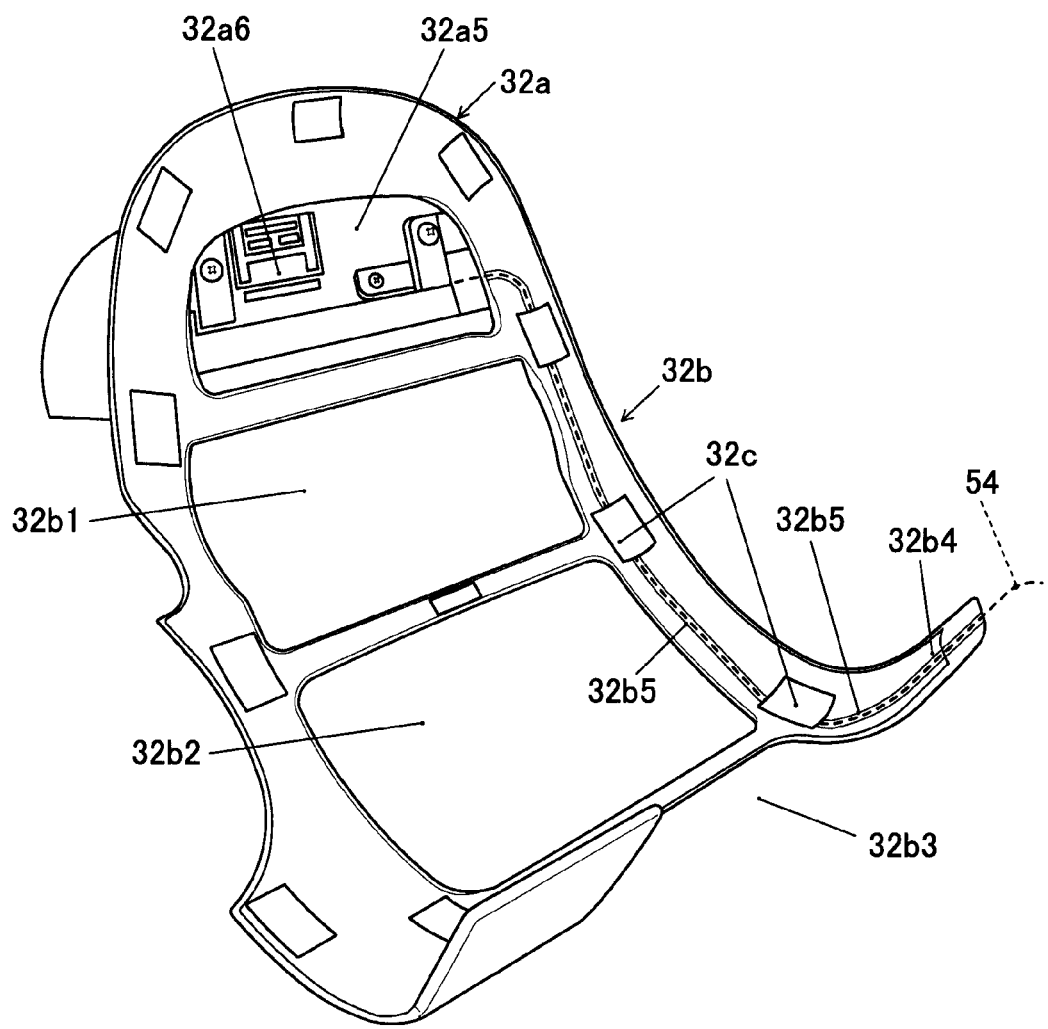
FIG. 31 is a perspective view of the rear side of the dashboard panel integrated cradle shown in FIG. 30.
Figure 32:
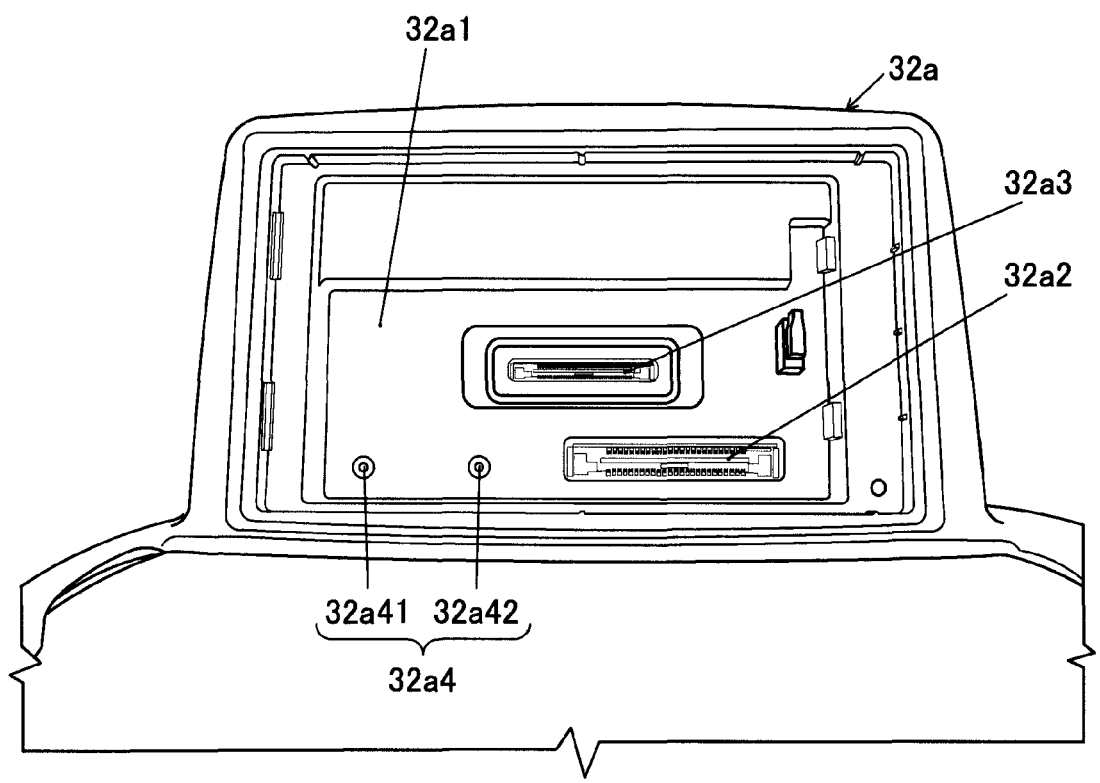
FIG. 32 is a front view of the main portion of the dashboard panel integrated cradle shown in FIG. 30.
Figure 33:
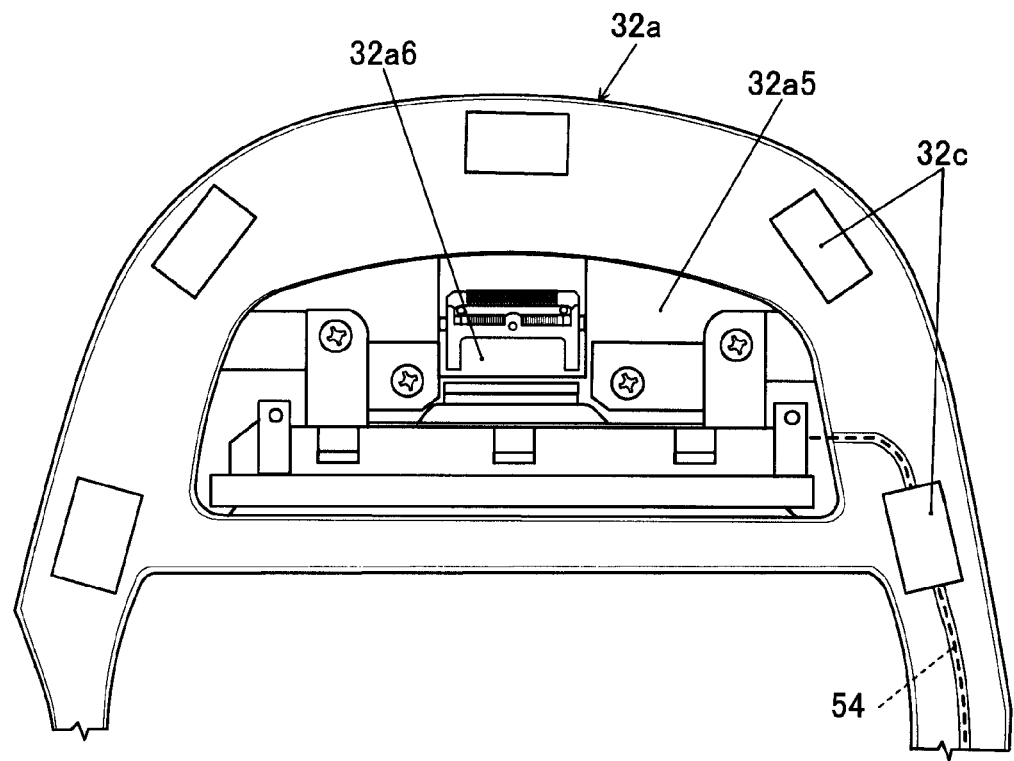
FIG. 33 is a front view of the main portion of the dashboard panel integrated cradle shown in FIG. 31.
Figure 34:
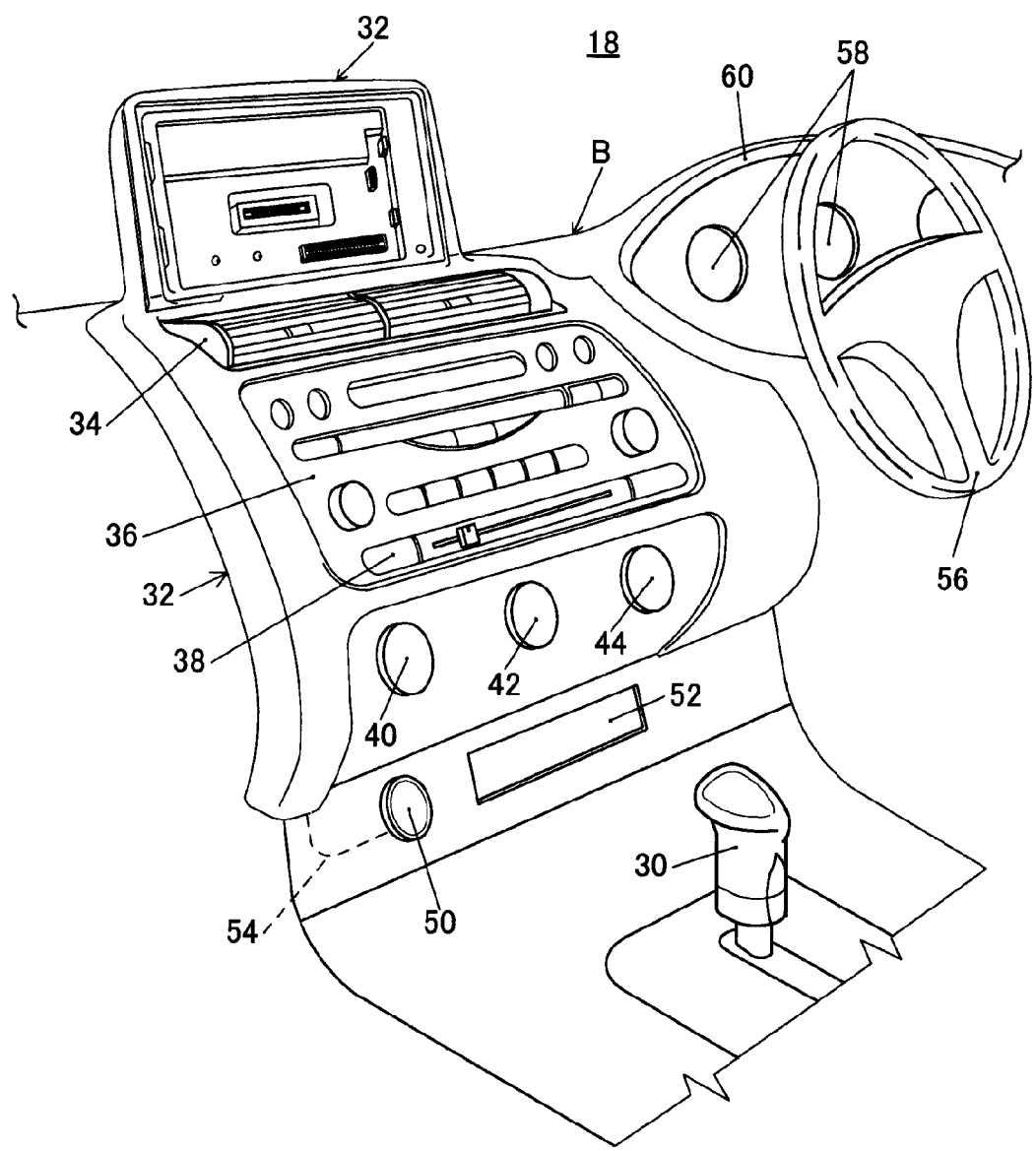
FIG. 34 is an explanatory view showing the condition where the dashboard panel integrated cradle is attached to the vehicle.

FIG. 30 is a perspective view of the dashboard panel integrated cradle (hereinafter called as "panel integrated cradle") 32, FIG. 31 is a perspective view of the rear side thereof, and FIGS. 32 and 33 are front views of the main portion thereof. FIG. 34 is an explanatory view showing the condition where the panel integrated cradle 32 is attached to the vehicle.

As shown in FIG. 30, the panel integrated cradle 32 comprises a cradle case part 32a accommodating a cradle unit that has the same function as the cradle unit 12 shown in FIG. 3, and a panel 32b formed at the bottom of the cradle case part 32a integrally therewith.

As shown in FIGS. 30 and 32, the front side of the cradle case part 32a having the structure similar to the front of the base unit 10, is formed with a recess 32a1 that is attachable/detachable with the front panel unit 14 (not shown). Symbol 32a2 designates a connector similar to the connector 10e of the recess 10b of the base unit 10, and symbol 32a3 an add-on module. Symbol 32a4 designates ground terminals, specifically two designated 32a41 and 32a42, similar to the ground terminals 10p.

As shown in FIGS. 31 and 33, a recess 32a5 at the rear of the cradle case part 32a is installed with a board 32a6 on which the cradle microcomputer 12b is mounted.

The panel 32b is formed with first, second and third notches 32b1, 32b2 and 32b3 to exhibit ladder shape as viewed from the front and, as shown in FIG. 34, composed of a horizontal part parallel with the upper surface of the dashboard, a vertical part parallel with or along the elevation surface of the dashboard, as viewed from the side, and a curving part connecting the horizontal part and vertical part.

The panel integrated cradle 32 is attached to the dashboard of the vehicle B with adhesive tape 32c. As described above, the front panel unit 14 is attached/detached to/from the recess 32a1 of the cradle case part 32a.

FIG. 34 is an explanatory view showing the condition where the panel integrated cradle 32 is attached to the dashboard of the vehicle B.

As illustrated, the first notch 32b1 is installed with a duct 34 of an air conditioner, the second notch 32b2 with an on-vehicle radio 36 and inside-outside air switching lever 38, and the third notch 32b3 with a duct changeover switch 40, air conditioner airflow dial 42, and air temperature control switch 44.

Owing to this configuration, airflow from the duct 34 is not interrupted and manipulation of the radio 36, etc., by the user is not disturbed because the panel integrated cradle 32 does not block them.

An external power supply socket (cigarette lighter) 50 and ashtray 52 are installed at the lower portion of the duct changeover switch 40. The panel 32b of the panel integrated cradle 32 is extended at the bottom to form an extension part 32b4. The extension part 32b4 is extended to the vicinity of the socket 50.

As shown in FIG. 31, on the back of the panel integrated cradle 32, a side portion including the extension part 32b4, precisely the side portion (right side in FIG. 31) extending to the vicinity of the socket 50, is formed with a gap or groove 32b5, so that an electrical wire 54 (indicated by a dashed-line in FIG. 34) is able to be installed therein. The electrical wire 54 interconnects the socket 50 and the cradle unit accommodated in the cradle case part 32a to enable power supply from the vehicle B to the cradle unit.

The ground side of the electrical wire 54 is connected to the ground terminals 32a4, connector 32a2 and add-on module 32a3 shown in FIG. 32, and also to grounds of electronic devices connected to the cradle 32 and that of the board 32a6 (shown in FIG. 31) mounting the cradle microcomputer 12b.

In FIG. 34, symbol 56 designates a steering wheel, symbol 58 meters and symbol 60 a meter visor. As illustrated, the panel integrated cradle 32 is positioned at a height near the meters 58.

As set out in the foregoing, this embodiment is configured to have a navigation apparatus having: a cradle unit 12 that is fastenable to a vehicle B and is equipped with at least a microcomputer; and a front panel unit 14 that is attachable to and detachable from the cradle unit 12 and is equipped with at least a display 14b displaying map data and a microcomputer (navigation microcomputer 14m) performing a navigation function to indicate a determined location of the vehicle on the map data, characterized in that: a panel 32b is integrally formed at the bottom of the cradle unit, more specifically, the panel integrated cradle 32 accommodating the cradle unit is formed, to be attachable to the vehicle B.

With this, it becomes possible to provide the navigation apparatus that is configured such that a member having a microcomputer performing a navigation function is attachable/detachable to/from the main body, i.e., the base unit 10, thereby improving ease of use, that the member can be easily attached to the dashboard of the vehicle B, and that unnatural impression is prevented from arising in the appearance.

Further, the embodiment is configured such that the panel (32b) is formed with an extension part 32b4 that is extended to vicinity of an external power supply socket 50 when the panel is attached to the vehicle B. With this, in addition to the foregoing effects, connection with the external power supply becomes further easier.

Further, the embodiment is configured such that back of the extension part 32b4 is formed with a gap 32b5 that houses an electrical wire 54 extending from the external power supply socket 50 to the cradle unit. With this, in addition to the foregoing effects, the electrical wire 54 supplying power to the cradle unit can be made invisible and unnatural impression is prevented from arising in the appearance.

Further, since the panel integrated cradle 32 has ladder shape along the dashboard of the vehicle B as viewed from the front and L-shape as viewed from the side, it can be surely held on the dashboard regardless of vibration and turn of the vehicle B.

Further, since the panel integrated cradle 32 is installed near the duct 34 through the first notch 32b1 and it amounts to installment near the cooling air, the temperature increase can be suppressed.

Further, since the panel integrated cradle 32 is positioned at a height near the meters 58, the user can see the liquid crystal panel 14b of the front panel unit 14 without greatly shifting directions of his/her eyes.

Second Embodiment

Figure 35:
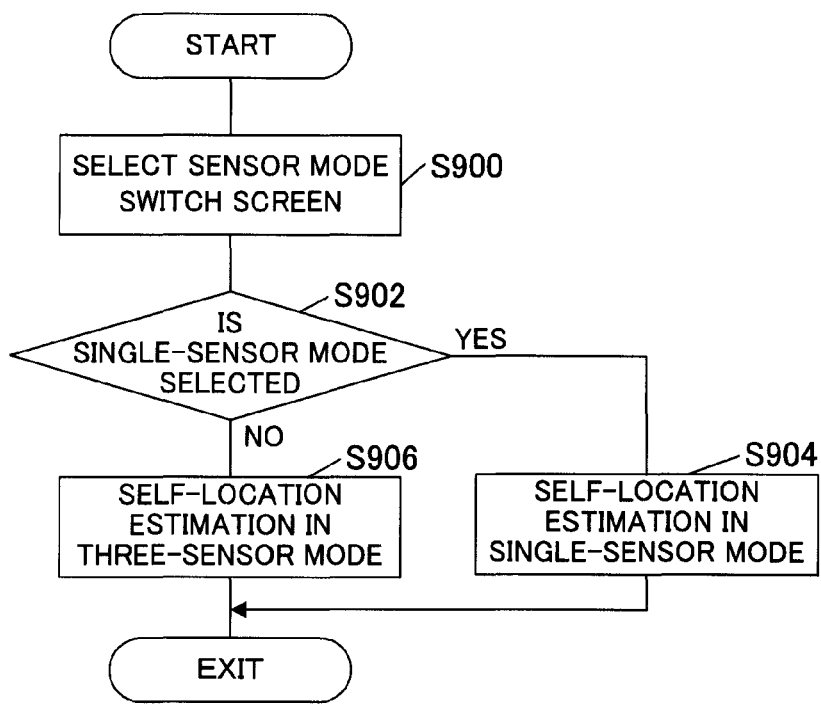
FIG. 35 is a flowchart similar to FIG. 10, but showing the operation of a navigation apparatus according to a second embodiment of this invention.

FIG. 35 is a flowchart similar to the flowchart of FIG. 10, showing a navigation apparatus according to a second embodiment of the present invention. The illustrated processing is, like that of FIG. 10, also executed by the navigation microcomputer 14m.

Now to explain, the illustrated processing commences when the user operates a sensor mode switch screen suitably displayed on the touch panel 14s located on the liquid crystal panel 14b, i.e., when the touch panel 14s is pressed, whereupon, in S900, the sensor mode switch screen is displayed in response to the touch panel operation and the user is prompted to make a selection.

Next, the program goes to S902, in which it is checked whether the user selected the single-sensor mode, i.e., whether an instruction was inputted from the outside regarding the detector to be used for determining the location of the vehicle A, and when the result is YES, the program goes to S904, in which it is determined that self-location estimation is to be done in the single-sensor mode, i.e., that the self-location (vehicle A) is to be determined by the output (GPS signal) of the GPS signal receiver 20, and when it is NO, to S906, in which it is determined that self-location estimation is to be done in the three-sensor mode, i.e., that self-location (vehicle A) is to be determined by the outputs of the three sensors (GPS signal receiver 20, wheel speed sensor 22 and gyrosensor), i.e., the detector or detectors to be used for determining the location of the vehicle A are determined in accordance with an instruction from the outside.

Note that when the three-sensor mode or single-sensor mode has been determined by the navigation microcomputer 14m in the flowchart of FIG. 10 or the flowchart of FIG. 11 of the first embodiment, the processing of FIG. 35 is given priority.

To explain this point, there may arise circumstances that the user can readily discern, or that only the user can detect, such as that the tires were changed to tires of a different diameter, e.g., snow tires, or that the road surface condition changed considerably, e.g., when an ordinary road surface changed to a slippery, icy road surface. The same is true when the vehicle itself is new and the navigation microcomputer 14m (or system microcomputer 10i) has not yet finished learning the output of the wheel speed sensor 22 adequately.

Since in such a case an error occurs when self-location is determined in the three-sensor mode using the output of the wheel speed sensor 22, the user is enabled to select the sensor in response to the circumstances, more specifically is enabled to select the single-sensor mode, by inputting an instruction from the outside. Note that the instruction from the outside is not limited to an instruction from the user and other persons such as a dealer, worker or the like, but can be an input signal or the like from another apparatus.

Further, it is also possible to forcibly switch to the three-sensor mode in the case where, after the single-sensor mode was determined by the navigation microcomputer 14m in the processing of S904, the learning period in the new environment is completed and the accuracy of location determination using the wheel speed sensor 22 is assured.

As explained in the foregoing, the second embodiment is configured to have a navigation apparatus having: a base unit 10 that is fastenable to a vehicle and is equipped with at least a microcomputer (system microcomputer 10i); and a front panel unit 14 that is attachable to and detachable from the base unit 10 and is equipped with at least a liquid crystal panel (display) 14b displaying map data and a microcomputer (navigation microcomputer 14m) performing a navigation function to indicate a determined location of the vehicle on the map data, characterized in that: there are provided with at least three sensors (detectors) including a receiver 20 that receives a GPS signal, a wheel speed sensor 22 that detects rotational speed of a wheel of the vehicle and a gyrosensor 24 that detects angular velocity about a vertical axis of the vehicle; and when an instruction regarding the detector or detectors to be used for determining the location of the vehicle is inputted from outside (S900, S902), the microcomputer of the front panel unit 14 determines the detector or detectors to be used for determining the location of the vehicle in accordance with the instruction from the outside (S904, S906).

As a result, when a radical change the user can readily discern arises in the road surface condition, such as when the tires were changed to tires of a different diameter, e.g., snow tires, or when an ordinary road surface changes to a slippery, icy road surface, the accuracy of vehicle location determination can be further enhanced by enabling selection in response to the change. The remaining configuration and effects are no different from the first embodiment.

Note that, although the case of there being multiple base units 10 or cradle units 12 was explained in the forgoing, it is acceptable for there to be a single base unit 10 or cradle unit 12.

INDUSTRIAL APPLICABILITY

According to this invention, in the navigation apparatus having a cradle unit that is fastenable to a vehicle and is equipped with at least a microcomputer; and a front panel unit that is attachable to and detachable from the cradle unit and is equipped with at least a display displaying map data and a microcomputer performing a navigation function to indicate a determined location of the vehicle on the map data, it is configured such that a panel is integrally formed at bottom of the cradle unit to be attachable to the vehicle. With this, a member having a microcomputer performing a navigation function is attachable/detachable to/from the main body, i.e., the base unit, thereby improving ease of use, the member can be easily attached to the dashboard of the vehicle B, and unnatural impression is prevented from arising in the appearance.

The invention claimed is:

1. A navigation apparatus, comprising:
    a cradle unit that is fastenable to a vehicle and is equipped with at least a microcomputer;
    a front panel unit that is attachable to and detachable from the cradle unit and is equipped with at least a display displaying map data and a microcomputer performing a navigation function to indicate a determined location of the vehicle on the map data; and
    a panel integrated cradle comprising a cradle case part accommodating the cradle unit and a panel integrally formed at bottom of the cradle case part to surround a device installed on a dashboard of the vehicle,
    wherein the panel integrated cradle is formed to be attachable to the vehicle,
    and the panel has a shape along a front surface of the dashboard of the vehicle.

2. The apparatus according to claim 1, wherein the panel is formed with an extension part that is extended to vicinity of an external power supply socket when the panel is attached to the vehicle.

3. The apparatus according to claim 2, wherein back of the extension part is formed with a gap that houses an electrical wire extending from the external power supply socket to the cradle unit.

* * * * *